(12) United States Patent
Harrison et al.

(10) Patent No.: US 11,584,459 B2
(45) Date of Patent: Feb. 21, 2023

(54) DRIVE UNITS FOR TRAILERS

(71) Applicant: PURPLE LINE LIMITED, Ipswich (GB)

(72) Inventors: Jonathan Harrison, Ipswich (GB); Ben Hawkins, Ipswich (GB)

(73) Assignee: Purple Line Limited, Ipswich (GB)

( * ) Notice: Subject to any disclaimer, the term of this patent is extended or adjusted under 35 U.S.C. 154(b) by 78 days.

(21) Appl. No.: 16/965,894

(22) PCT Filed: Feb. 1, 2019

(86) PCT No.: PCT/EP2019/052550
§ 371 (c)(1),
(2) Date: Jul. 29, 2020

(87) PCT Pub. No.: WO2019/149912
PCT Pub. Date: Aug. 8, 2019

(65) Prior Publication Data
US 2021/0001936 A1  Jan. 7, 2021

(30) Foreign Application Priority Data

Feb. 2, 2018 (GB) .................................... 1801760

(51) Int. Cl.
*B60K 7/00* (2006.01)
*B62D 59/04* (2006.01)
(Continued)

(52) U.S. Cl.
CPC ............ *B62D 59/04* (2013.01); *B60K 7/0007* (2013.01); *B60L 50/60* (2019.02); *B60L 53/80* (2019.02);
(Continued)

(58) Field of Classification Search
CPC ......... B62D 59/04; B60L 50/60; B60L 53/80; B60L 2200/28; B60L 2200/46; B60Y 2200/147
See application file for complete search history.

(56) References Cited

U.S. PATENT DOCUMENTS 3,861,482 A * 1/1975 Stephens ................ B60D 1/665
180/19.1
4,416,460 A * 11/1983 Morris .................. B62B 5/0026
188/69
(Continued)

FOREIGN PATENT DOCUMENTS

DE   202016105321 U1 *  1/2018
DE   202016105321 U1     4/2018
(Continued)

OTHER PUBLICATIONS

Search Report for GB 1801760.8; Damien Huxly; dated Jun. 25, 2018; 4 pages.
(Continued)

*Primary Examiner* — James M Dolak
*Assistant Examiner* — James J Triggs
(74) *Attorney, Agent, or Firm* — Dickie, Billig & Czaja, PLLC

(57) ABSTRACT

The present invention relates to a drive unit in the form of a caravan mover (10) comprising a motor (12) (drive means) and a head (14) which are linked together by a gear mechanism (16). The head (14) provides a roller (15) which is rotatably mounted on a shaft. The roller (15) is arranged, in use, to be urged or pressed against the tread portion (surface) of a tyre. The drive unit is controlled by a control unit (ECU) which controls the movement of the driven roller (15) between the disengaged position and the engaged position and also controls the rotation (and direction) of the driven roller (15). The caravan mover (10) of the present invention includes an integral power supply such that the unit comprises a single integral system which is easily installed on the caravan and does not require the routing of cables from a remote power supply. The battery (30) comprises securement means in order to quickly and easily secure the battery (30) to the drive unit housing and, in
(Continued)

particular, to the housing (20) of the motor (12). The securement of the battery (30) to the motor 6 also automatically and simultaneously aligns and connects terminals of the battery (30) to power receiving terminals of the motor (16). Such a quick and simply securement mechanism provides a battery (30) can be quickly and easily removed, for example, in order to be charged. Accordingly, the drive unit/caravan mover (10) (including the motor, roller, battery, control unit and mounting means) forms a single self-supporting component which is solely secured to the caravan/trailer at a single location by the mounting means.

24 Claims, 15 Drawing Sheets

(51) Int. Cl.
*B60L 50/60* (2019.01)
*B60L 53/80* (2019.01)

(52) U.S. Cl.
CPC ....... *B60L 2200/28* (2013.01); *B60L 2200/46* (2013.01); *B60Y 2200/147* (2013.01)

(56) References Cited

U.S. PATENT DOCUMENTS

| | | | | |
|---|---|---|---|---|
| 4,860,841 | A * | 8/1989 | Sacco | B60D 1/66 180/19.1 |
| 6,945,343 | B1 * | 9/2005 | Moreau | B60D 1/66 180/11 |
| 2010/0241398 | A1 * | 9/2010 | Cheah | G04F 10/105 702/66 |
| 2021/0039732 | A1 * | 2/2021 | Harrison | B60K 17/043 |

FOREIGN PATENT DOCUMENTS

| | | |
|---|---|---|
| EP | 2409903 A1 | 1/2012 |
| GB | 2514870 A | 12/2014 |
| GB | 2541673 A | 3/2017 |
| KR | 20140145786 A | 12/2014 |

OTHER PUBLICATIONS

International Search Report for PCT/EP2019/052550; Gabriele Julich; dated May 13, 2019; 5 pages.
International Preliminary Report on Patentability for PCT/EP2019/052550; E. Fontana Balparda; dated Feb. 7, 2020; 16 pages.

* cited by examiner

DRIVE UNITS FOR TRAILERS

FIELD OF THE INVENTION

The present invention relates to a drive unit for a trailer, an assembly comprising a trailer and a drive unit and a method of installing a drive unit to a trailer. In particular, the present invention relates to a drive unit for a caravan which is typically known as a caravan mover.

BACKGROUND TO THE INVENTION

Trailers are unpowered vehicles which are designed to be coupled to and then moved by a powered vehicle, for example a car, van etc. Such trailers include caravans. Generally, caravans are towed to a suitable site by a car. Once at a site, the caravan is unhitched from the car and the caravan is moved onto a pitch. The driver can try to manoeuvre the caravan directly on to the pitch but this is frequently not possible due to the confined spaces etc. Caravans are unpowered but a person or group of people can manually push and/or pull the caravan to the pitch. Alternatively, a drive system such as a caravan mover can be used to move the caravan on to the pitch.

A caravan mover generally comprises a motor which is controlled by a user. The caravan mover includes engagement means whereby a roller is selectively pressed against or removed from the outer tread of a wheel of the caravan. Typically, a caravan mover includes a drive roller which is urged into contact with the outer tread of a wheel of the caravan. A motor is arranged to rotate the drive roller which, through contact with the outer tread of the wheel, thereby rotates the wheel of the caravan. The caravan generally includes a caravan mover on one or two opposed wheels on an axle. Accordingly, through the selective movement of each caravan mover and the respective caravan wheels, the caravan can be arranged to independently move forwards or backwards and can be turned in either direction.

The motor of a caravan mover requires an electrical power supply. This power source is generally provided by a leisure battery provided inside the caravan. Alternatively, if the caravan does not have a leisure battery, then a battery and charger may be specifically fitted inside the caravan. The installation of such a specific power system takes a significant amount of time and this, therefore, significantly increases the cost of having a caravan mover. The dedicated power source may be fitted and located underneath a bed or a seating area but this still takes up valuable space inside the caravan. Furthermore, the power supply system must penetrate through the caravan from the outside, where the caravan mover is located, to the inside, where the battery is located. This penetration inevitably creates potential problems and areas of weakness which could cause the integrity of the caravan to deteriorate over time.

Each retrospectively fitted caravan mover must be individually created and installed since the cables must be optimally routed and the lengths of the cables must be cut to the correct lengths. The cables need individual guides which are generally secured into the underside of the caravan.

The electric control system for the caravan mover is generally fitted inside the caravan next to the battery. Again, this requires cables to be individually secured and routed through the caravan to the external caravan mover.

Overall, the retrospective fitting of a caravan mover requires a bespoke system which is individually created and fitted to the caravan and thereby such caravan movers can be relatively expensive.

It is an aim of the present invention to overcome at least one problem associated with the prior art whether referred to herein or otherwise.

SUMMARY OF THE INVENTION

According to a first aspect of the present invention there is provided a drive unit for a trailer comprising drive means, power means and mounting means, the mounting means being arranged, in use, to be secured to a trailer, the drive means being arranged to rotate a wheel of a trailer around an axle of the trailer, the drive means comprising actuating means to move the drive means between:
  a disengaged position, and
  an engaged position in which movement is transmitted from the drive means to a wheel of the trailer,
  wherein the power means comprises a detachable battery which is mounted directly within the drive unit and is supported therein and wherein the drive unit forms a single integral self-supporting component.

The drive unit may comprise control means. The control means may comprise a control unit and preferably an electronic control unit.

The control means may be arranged to be supported within the single self-supporting component. The control means may locate and may be supported remotely from the single self-supporting component. The control unit may be mounted to the drive means (motor). The control unit may locate in an interface between the detachable battery and the drive means.

Preferably the drive unit forms a single integral self-supporting component. Preferably the single self supporting component is arranged to be movable mounted relative to the trailer. The single self supporting component may be mounted in a frame fixed to the trailer. The single self supporting component may be slidable mounted in the frame fixed to the trailer.

Preferably prior to use, elements of the drive unit (the drive means, control means, power means and mounting means) are rigidly/statically/fixedly secured together.

Preferably, in use, elements of the drive unit (the drive means, control means, power means and mounting means) are arranged to be simultaneously mounted and secured to the trailer.

Preferably the mounting means is arranged to be secured to the trailer in order to simultaneously mount the drive unit (including the drive means, control means and power means) to the trailer.

Preferably the drive unit comprises a battery receiver (battery holder). Preferably the battery receiver is shaped to receive the detachable battery. Preferably the battery receiver is shaped to (rigidly/statically/fixedly) support the detachable battery within the single integral self-supporting component.

Preferably, in use, the battery is integral with the drive means and/or the control means.

Preferably the drive unit comprises locking means.

The locking means may comprise a remotely operated locking mechanism. The locking means may comprise an electro-mechanical locking device. The locking means may comprise a solenoid lock.

The locking means may be arranged to lock the power means (battery) and or control means (ECU) within the drive unit. Preferably the locking means may be arranged to lock the power means (battery) and or control means (ECU) within the drive unit to provide a single integral self supporting component which prevents the unauthorised removal of the power means (battery) and/or control means (ECU).

The drive unit may comprises a first locking means (first locking mechanism) which may be arranged to lock the power means (battery) within the drive unit and/or a second locking means to lock the control means (ECU) within the drive unit.

Preferably the first locking means is arranged to lock the power means (battery) to the control means (ECU). Preferably the second locking means is arranged to lock the control means (ECU) to the drive means (motor or motor housing).

The power means (battery) may be locked to the control means by a solenoid lock and the control means may be locked to the drive means by internal securement element(s). Preferably the internal securement elements are not accessible (and/or exposed) whilst the power means (battery) is secured/mounted (locked) to the control means.

The solenoid lock may comprise a lock bolt which can extend from and withdraw into a lock body. Preferably the lock bolt is arranged to engage with a keep. The lock bolt may be mounted to the control means and the keep may be mounted to the power means. The keep may comprise a bracket with an aperture defined therein. The control means may comprise a slot through which the keep passes prior to the lock bolt being engaged through the aperture.

Preferably power is supplied to the locking means to move the lock from the locked position to the unlocked position. Preferably the default (unpowered) position of the locking means is in a locked position.

The power means (battery) may comprise a (proximal) face which is arranged to engage a corresponding (distal) face of the control means and may create an interface therebetween. The proximal face of the power means (battery) may comprises an electrical connector and preferably a male electrical connector. The (distal) face of the control means (ECU) may comprise an electrical connector and preferably a female connector.

The proximal face of the power means (battery) may comprises a guide element and preferably comprises two (offset) guide elements and preferably comprises male guide elements (lugs). The (distal) face of the control means (ECU) may comprise a guide element and preferably comprises two (offset) guide elements and preferably comprises female guide elements (holes/passageways/apertures).

The removable battery may comprise a rechargeable battery.

The drive unit may comprise an auxiliary power supply input to supply auxiliary power to the drive unit. Preferably the auxiliary power supply input enables auxiliary power to be supplied to the drive unit to supplement the power from the power means and/or to recharge the power means.

Preferably the drive means comprises a motor. The drive means may comprise a plurality of motors. The drive means may comprise a first motor and a second motor. The drive means may comprise a motor(s), a drive transmission system and a roller and, in which, the motor preferably drives (rotates) the roller through drive transmitted through the drive transmission system. The drive transmission system may comprise a gear train. The drive transmission system may comprise a plurality of gear trains. The drive transmission system may comprise a first gear train and a second gear train.

Preferably, in use, the weight of the detachable/removable battery is solely supported (suspended) from the drive unit and, more preferably, by/from the mounting means and/or control means and/or drive means and/or motor.

The detachable/removable battery may be arranged to be connected to the drive means and/or motor with internal connectors provided on an interface between the detachable battery and the motor and wherein the interface is preferably concealed and shrouded when the battery is attached to the motor. Accordingly, intermediary cables may not need to be routed external of a housing of the drive unit or to extend away from the housing.

The detachable/removable battery may be arranged to be connected to the control means and/or motor with internal connectors provided on an interface between the detachable battery and the control unit/motor and wherein the interface is preferably concealed and shrouded when the battery is attached to the control unit/motor. Accordingly, intermediary cables may not need to be routed external of a housing of the drive unit or to extend away from the housing.

The detachable/removable battery may be arranged to be connected to the drive means and/or motor and/or control unit such that intermediary cables do not need to be routed external of the housing.

The drive unit may comprise two terminals from the motor/control unit which are arranged to be connected to two terminals of the battery.

The mounting means may solely mount the drive unit to the trailer. The mounting means may solely and simultaneously mount all elements (drive means and power means) of the drive unit to the trailer.

The mounting means may comprise a series of mounting elements provided on the housing of the drive unit. Preferably the mounting means comprises a series of securement apertures through which securement elements (bolts) can project in order to mount the drive unit to a trailer.

The mounting means may comprise a mounting frame and a mounting carriage. Preferably the mounting carriage is movably (slidably) secured within the mounting frame. Preferably the mounting carriage is arranged to slidably move from the disengaged position to the engaged position. Preferably in the disengaged position the roller is spaced from the ground contacting surface of the wheel and in the engaged position the roller is in contact (and is urged against) the ground contacting surface of the wheel.

The mounting means (mounting frame) may comprise a chassis mounting member which is arranged, in use, to be secured to a part of a chassis of the trailer. The mounting member may comprise an elongate member. The mounting member may provide an enclosure into which the detachable battery may be supported. The enclosure may have an opening located at one (outer) longitudinal end of the mounting member. A battery receiver may locate within the enclosure which may receive the detachable battery and engage with the terminals of the battery. The drive unit may comprise a power cable to connect the battery receiver with the control unit and/or drive means.

The control unit may locate within the enclosure. A battery receiver may also locate within the enclosure which may receive the detachable battery and engage with the terminals of the battery. The drive unit may comprise a power cable to connect the control unit with the drive means.

The power means may be arranged to be secured directly to the drive means and/or control means.

The drive unit may comprise a combined body (and associated combined housing) which comprises the drive means and the control means.

The power means may comprising a body which is arranged to be directly secured (engaged) to a battery receiver which may be provided by or secured to a body of the drive means and/or a body of the control means and/or the mounting means and/or the combined body/housing.

The power means may comprising a body which is arranged to be clipped directly to a battery receiver which may be provided by or secured to a body of the drive means and/or a body of the control means and/or the mounting means and/or the combined body/housing.

Preferably the battery is arranged to be slidably engaged with a battery receiver which may be provided by or secured to the body of the drive means/control means means/mounting means and/or the combined body/housing.

Preferably the battery comprises a projecting portion which is arranged to be slidably received within a channel provided on a battery receiver which may be provided by or secured to the body of the drive means/control means means/mounting means and/or the combined body/housing. The projecting portion may comprise two opposing lateral flanges which are arranged to engage with two retaining lips provided on either side (opposing lateral sides) of the channel. The battery may comprise a movable clip portion which is arranged to automatically extend into an engaging recess provided on the battery receiver and this clip may automatically become engaged at a position when the battery is correctly positioned relative to the battery receiver such that terminals of the battery contact respective terminals provided by the battery receiver/control means/drive means. Preferably the clip portion requires manual movement in order to disengage the clip from the recess position and to enable the battery to be released and removed from the battery receiver.

The channel portion may extend along a longitudinal direction of the battery receiver and/or drive means. The channel may extend along a lower face of the battery receiver and/or drive means and/or control means.

The channel portion may extend along an end face (longitudinal end face) of the battery receiver and/or drive means and/or control means. The channel may extend radially along an end face of the drive means.

The battery receiver may comprise two receiving terminals which are arranged to receive power from two power terminals provided by the battery.

The terminals may all be exposed when the battery is removed from the battery receiver.

Preferably the drive unit comprises a shroud portion which is arranged to protect the interface between the battery and the drive means and/or control means and may shroud the interface between the drive means and the control means.

The drive unit may comprise a chamber or enclosure into which the battery may locate and be concealed therein. The chamber may comprise a removable cover.

The drive unit may comprise control means to control the movement of the trailer by the drive unit. The control means may comprise an operating device which may comprise a remote control unit. The remote control unit may enable a user to move the trailer by wireless signals (e.g. infra-red).

Preferably the drive unit comprises a self-contained drive unit for the independent movement of a trailer.

The drive unit may comprise an auxiliary drive for an unpowered trailer.

The drive unit may comprise control means to control the movement of the trailer by the drive unit. The control means may comprise a control unit mounted to the trailer with the mounting means and an operating device which may comprise a remote control unit. The remote control unit may enable a user to move the trailer by wireless signals (e.g. infra-red).

Preferably the mounting means is arranged to mount the drive unit to a chassis of the trailer. Preferably the mounting means is arranged to solely mount the drive unit to a chassis of the trailer.

Preferably the mounting means is arranged to mount the drive unit on an external part of a trailer and preferably to the underside of a trailer.

Preferably the drive means comprises a driven roller.

The drive system may be arranged to rotate a wheel of a trailer around an axle of the trailer.

The actuation means may comprise movement means (drive engagement means). Preferably the movement means is arranged to move the driven roller between an engaged position in which the driven roller is urged against an outer circumferential surface of a wheel of the trailer and a disengaged position in which the driven roller is disengaged with the outer circumferential surface of the wheel of the trailer.

The movement means may comprise an actuator and preferably comprises an electro-mechanical actuator.

The movement means may comprise a solenoid.

The movement means may comprise bias means or urging means to urge the driven roller towards an engaged position.

The movement means may extend or retract the driven roller from being urged against the outer circumferential surface of the wheel of the trailer.

The driven roller may comprise an elongate cylindrical roller with a contoured contact surface. The contact surface may comprise a plurality of longitudinal ridges. The longitudinal ridges may have a substantially sinusoidal profile. Preferably the contact surface is arranged, in the engaged configuration, to be urged against a tread of the wheel of the trailer. Preferably the contoured contact surface provides a frictional grip with the tread of the wheel of the trailer.

Preferably the drive means comprises a motor and preferably comprises an electrically powered motor.

The power source may comprise a battery which may be contained in a battery enclosure. The battery enclosure may be water proof and/or shock proof.

Preferably the present invention comprises a powered drive unit for a trailer.

Preferably the present invention comprises a drive unit for a trailer with an integral power supply.

Preferably the drive means comprises an auxiliary drive.

Preferably the trailer comprises a caravan.

The drive unit may be arranged to connect to a recharging system. The recharging system may comprise the leisure battery (and/or other caravan power supply) mounted with the caravan. The recharging system may comprise recharging cables which connect the leisure battery (and/or other caravan power supply) to the control means and/or a secondary charging unit (mounted adjacent on the drive unit) and/or the detachable battery.

According to a second aspect of the present invention there is provided an assembly comprising a trailer and a drive unit for the trailer, the drive unit comprising drive means, power means and mounting means, the mounting means being arranged, in use, to be secured to the trailer, the drive means being arranged to rotate a wheel of the trailer around an axle of the trailer, the drive means comprising actuating means to move the drive means between:

a disengaged position, and an engaged position in which movement is transmitted from the drive means to a wheel of the trailer, wherein the power means comprises a detachable battery which is mounted directly within the drive unit and is supported therein and wherein the drive unit forms a single integral self-supporting component.

According to a third aspect of the present invention there is provided a method or providing drive to a wheel of a trailer, the method comprising mounting a drive unit to the trailer wherein the drive comprises drive means and power means, the drive means being arranged to rotate a wheel of the trailer around an axle of the trailer, the power means comprising a detachable battery, the method comprising moving the drive means between:
- a disengaged position, and
- an engaged position in which movement is transmitted from the drive means to a wheel of the trailer,
- wherein the method further comprises mounting the detachable battery directly within the drive unit in order for the battery to be supported therein and wherein the drive unit forms a single integral self-supporting component.

According to a fourth aspect of the present invention there is provided a drive unit for a trailer comprising drive means, power means and mounting means, the mounting means being arranged, in use, to be secured to a trailer, the drive means being arranged to rotate a wheel of a trailer around an axle of the trailer, the drive means comprising actuating means to move the drive means between:
- a disengaged position, and
- an engaged position in which movement is transmitted from the drive means to a wheel of the trailer,
- wherein the power means comprises a detachable battery which is mounted directly to a housing of the drive unit and is supported therefrom and wherein the drive means and the power means form a single integral self-supporting component.

According to a fifth aspect of the present invention there is provided an assembly comprising a trailer and a drive unit for the trailer, the drive unit comprising drive means, power means and mounting means, the mounting means being arranged, in use, to be secured to the trailer, the drive means being arranged to rotate a wheel of the trailer around an axle of the trailer, the drive means comprising actuating means to move the drive means between:
- a disengaged position, and
- an engaged position in which movement is transmitted from the drive means to a wheel of the trailer,
- wherein the power means comprises a detachable battery which is mounted directly to a housing of the drive unit and is supported therefrom and wherein the drive means and the power means form a single integral self-supporting component.

According to a sixth aspect of the present invention there is provided a method or providing drive to a wheel of a trailer, the method comprising mounting a drive unit to the trailer wherein the drive comprises drive means and power means, the drive means being arranged to rotate a wheel of the trailer around an axle of the trailer, the power means comprising a detachable battery, the method comprising moving the drive means between:
- a disengaged position, and
- an engaged position in which movement is transmitted from the drive means to a wheel of the trailer,
- wherein the method further comprises mounting the detachable battery directly to a housing of the drive unit in order for the battery to be supported therefrom and wherein the drive means and the power means form a single integral self-supporting component.

BRIEF DESCRIPTION OF THE DRAWINGS

The present invention will now be described by way of example only, with reference to the drawings that follow, in which.

DESCRIPTION OF THE PREFERRED EMBODIMENTS

Figure 1:
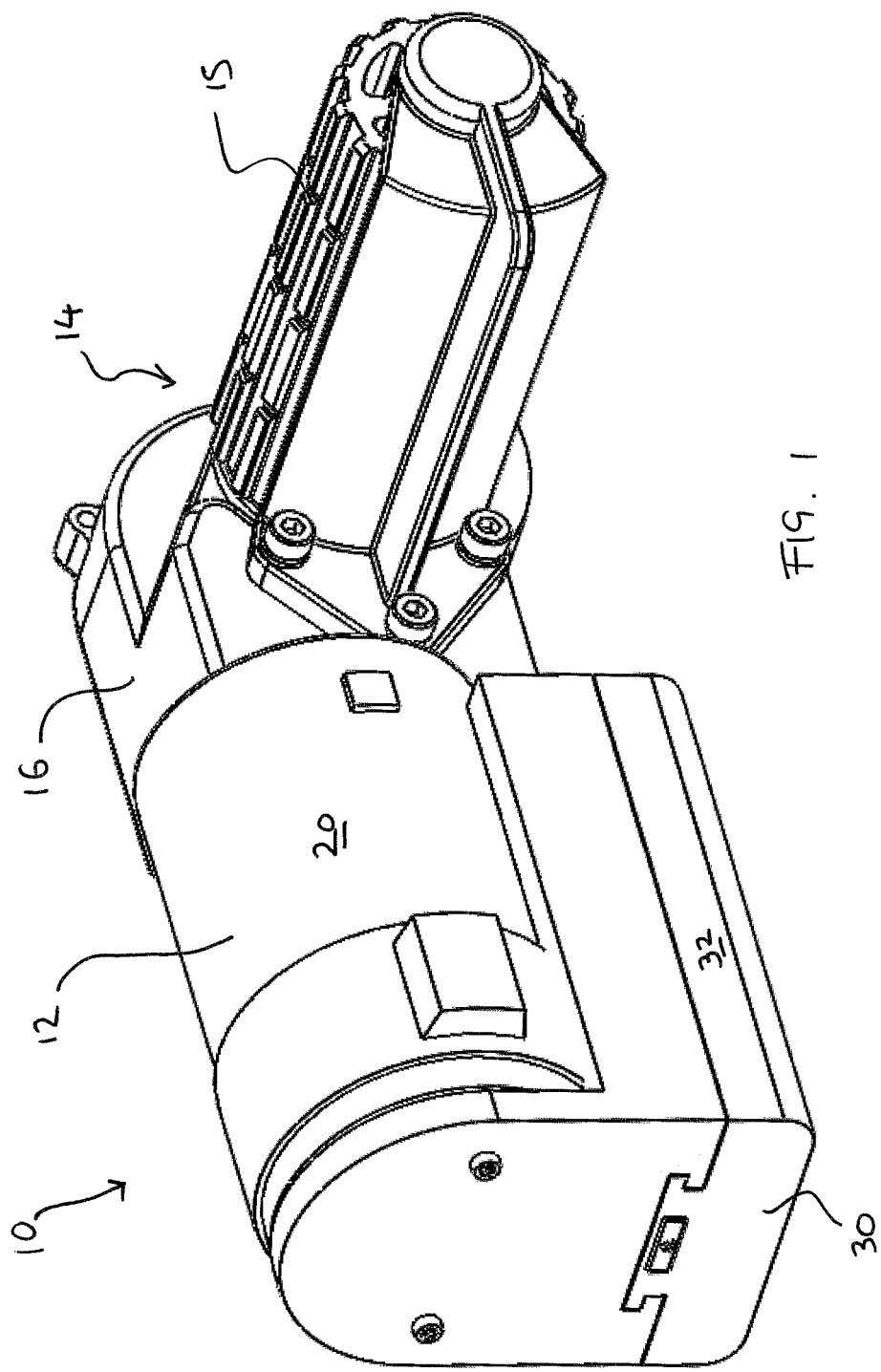
FIG. 1 is a perspective view of an embodiment of a caravan mover with an attached battery in accordance with the present invention.

As shown in FIG. 1, a drive unit in the form of a caravan mover 10 comprises a motor 12 (drive means) and a head 14 which are linked together by a gear mechanism 16. The head 14 provides a roller 15 which is rotatably mounted on a shaft. The roller 15 is arranged, in use, to be urged or pressed against the tread portion (surface) of a tyre.

The drive unit is controlled by a control unit (ECU) which controls the movement of the driven roller 15 between the disengaged position and the engaged position and also controls the rotation (and direction) of the driven roller 15. The drive unit 10 comprises mounting means to solely mount the drive unit 10 to the trailer/caravan.

The drive unit/caravan mover 10 (including the motor, roller, battery, control unit and mounting means) forms a single self-supporting component which is solely secured to the caravan/trailer at a single location by the mounting means. The caravan mover 10 is self-supporting such that all of the individual elements are secured relative to each other to form a rigid/fixed static component in which the elements are not individually supported at separate locations and solely connected by cables and wires, i.e. the battery is not remotely located on the caravan and separately secured to the caravan and then connected by routed cables.

In some embodiments, the control unit may be located remotely from the motor/driven roller and the control unit (ECU) may be located within the caravan. In some of these embodiments, wires are provided to connect the battery to the ECU. Further wires then connect the output of the ECU to the motor(s). The control of the drive unit(s) is thereby managed within the ECU and the relevant power is output to the motor(s).

The purpose of the caravan mover 10 is to rotate the wheels of a caravan such that the caravan can be independently moved and positioned without having to manually move the caravan or to secure the caravan to a motorised towing vehicle. The caravan mover 10 thereby provides a roller 15 which is urged and pressed against a ground engaging surface of one of the wheels of the caravan. The roller 15 is arranged to frictionally engage with the tread of the tyre such that the rotation of the roller 15 causes the caravan wheel to rotate.

The roller 15 is provided with a frictional surface and this is further enhanced by the roller 15 having a raised pattern which may comprises longitudinal rib portions which may have a generally sinusoidal or wavy pattern. These longitudinally raised portions may each be non-continuous (and have indented breaks) in order to help with the frictional engagement and prevent the pattern from becoming clogged up with dirt/debris. The peaks and troughs on the roller 15 help to efficiently transfer the rotation of the roller 15 to the wheel and to prevent slippage.

The caravan mover 10 includes a mounting mechanism which is arranged to be securely mounted and fixed to the caravan and, in particular, the caravan mover 10 may be secured to a part of a chassis of the caravan. The caravan mover 10 also includes an actuating mechanism such that at least the roller 15 is moved between a first (disengaged) position and a second (engaged) position. In the disengaged position, the roller 15 is spaced from the tread of the wheel. In the engaged position, the roller 15 is urged and pressed against the tread of the caravan wheel. Accordingly, the caravan mover 10 is mounted to the caravan at a fixed position such that the roller 15 is urged into the engaged position upon actuation of the caravan mover 10.

The actuating system may comprise a pneumatic, hydraulic, electric motor or a manual actuating system. The roller 15 is arranged to be moved along a translational axis in a first direction which extends from the motor 12 towards the head 14 and hence towards the tread of the tyre. The actuating mechanism may be electrically driven and/or controlled and this may be achieved using the same power source as the motor 12 used to drive the roller 15.

The head 14 of the caravan mover 10 is arranged to move away from the housing 20 of the motor 12 and wherein the housing 20 of the motor 12 is securely fixed to the caravan chassis. Accordingly, this moves the roller 15 relative to the caravan wheel. In particular, the mounting mechanism comprises a mounting carriage in which the motor is statically fixed. This mounting carriage is movably mounted within a mounting frame. The mounting frame provides mounting slots into which mounting elements (lugs) which project outwardly from the lateral sides of the motor housing 20. These slots guide the movement of the motor/roller from the disengaged position to the engaged position.

The caravan mover 10 of the present invention includes an integral power supply such that the unit comprises a single integral system which is easily installed on the caravan and does not require the routing of cables from a remote power supply. The battery 30 comprises securement means in order to quickly and easily secure the battery 30 to the drive unit housing and, in particular, to the housing 20 of the motor 12. The securement of the battery 30 to the motor 16 also automatically and simultaneously aligns and connects terminals of the battery 30 to power receiving terminals of the motor 16. Such a quick and simply securement mechanism provides a battery 30 can be quickly and easily removed, for example, in order to be charged. During the charging of a first battery, a second battery could then be quickly and easily installed. This enables a user to maintain a fully powered battery which can be used instantaneously should the attached battery be low on power.

Figure 2:
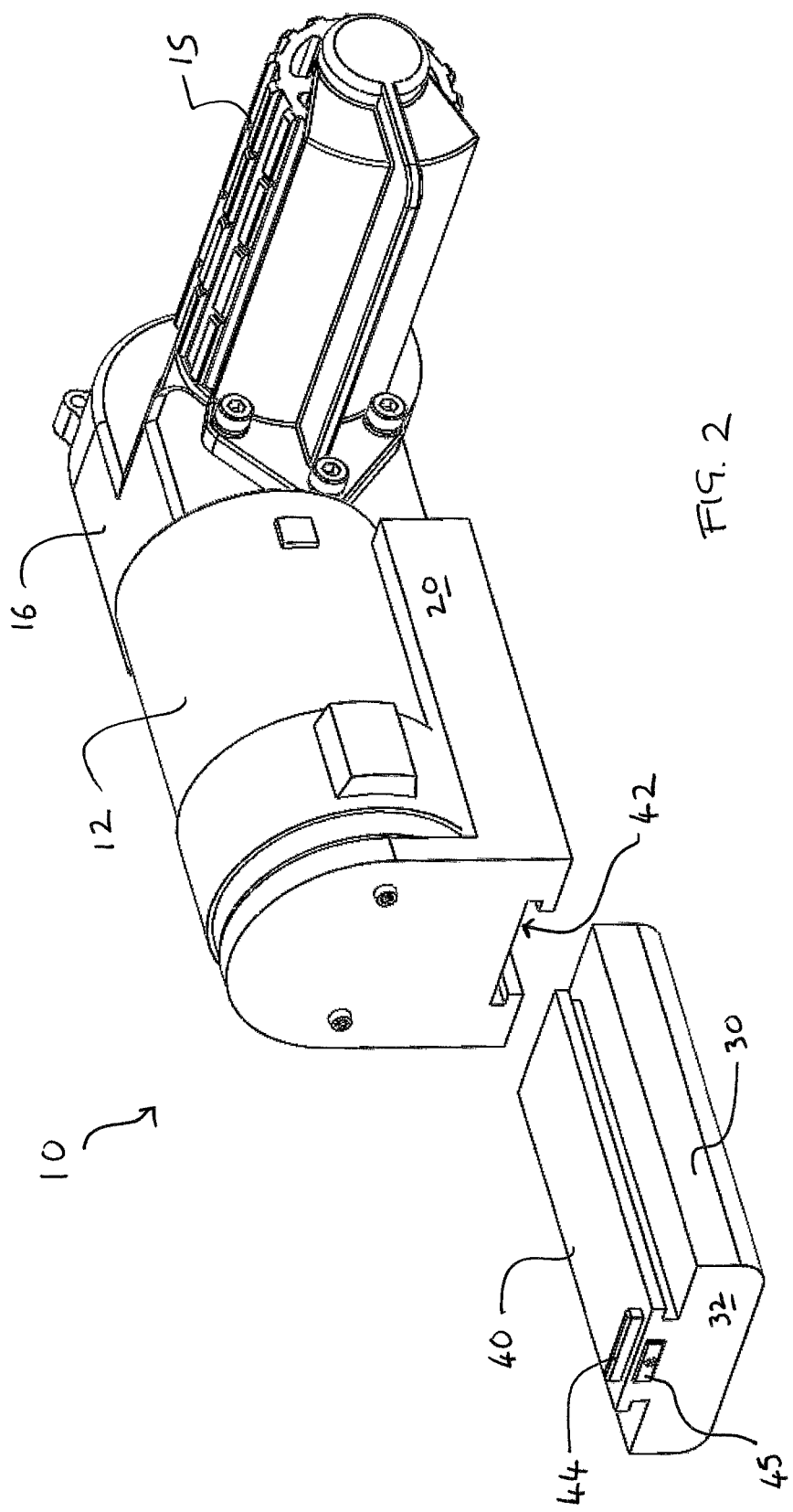
FIG. 2 is a perspective view of an embodiment of a caravan mover with a detached battery in accordance with the present invention.

Several suitable securement mechanisms are available to secure the battery 30 directly to the motor 12 and examples are shown herein. As shown in FIG. 1 and FIG. 2, the battery 30 or battery housing 32 includes an elongate rail section 40 which is arranged to be slidably engaged within a slot 42 or channel provided on a lower surface of the housing 20. The battery 30 or battery housing 32 includes a clip portion 44 which will be received and engaged within a recess once the battery 30 is fully engaged and the respective terminals are in contact. A push button 45 may be provided in order for a user to be able to release the battery 30 from the channel 42 and such a mechanism prevents the battery 30 from becoming accidentally or inadvertently detached, for example, during transit.

Figure 3:
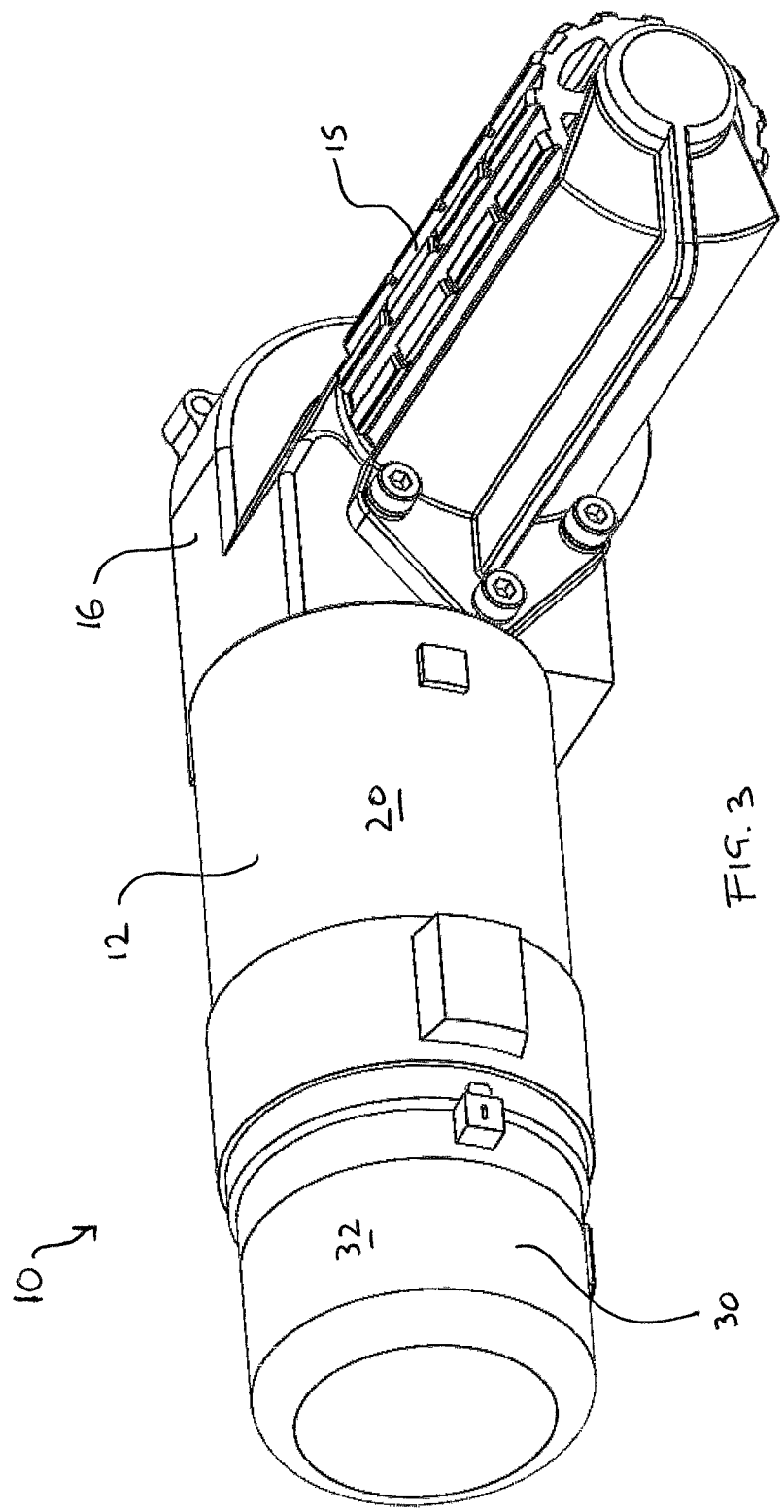
FIG. 3 is a perspective view of another embodiment of a caravan mover with an attached battery.
Figure 4:
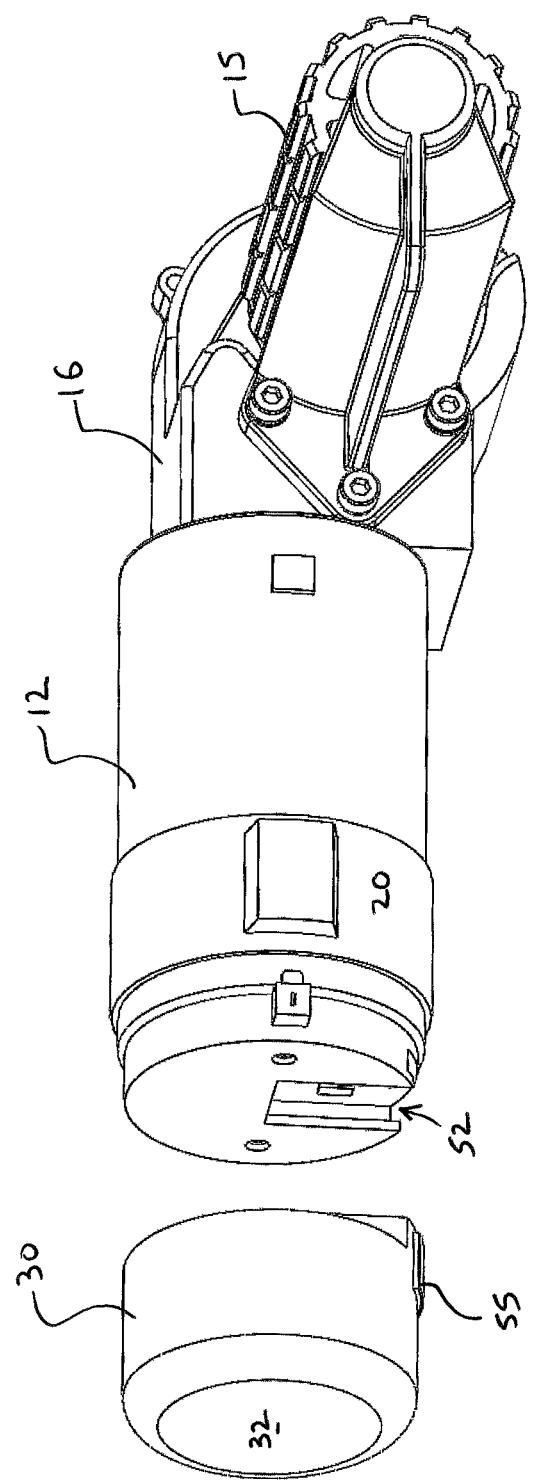
FIG. 4 is a perspective view of another embodiment of a caravan mover with a detached battery.

A further embodiment of a battery securement system is show in FIG. 3 and FIG. 4 in which the battery 30 comprises a generally cylindrical body 32 which is secured on the longitudinal end of the motor 12 or motor housing 20. Again, the housing 20 provides a slot 52 or channel into which a securement rail 50 provided on the battery is engaged. Again, a push button 55 and clip 54 may be used to retain the battery 30 in the fully secured position. The battery 30 has a quick release system to enable the battery 30 to be simply, quickly and securely mounted within the drive unit.

Figure 5:
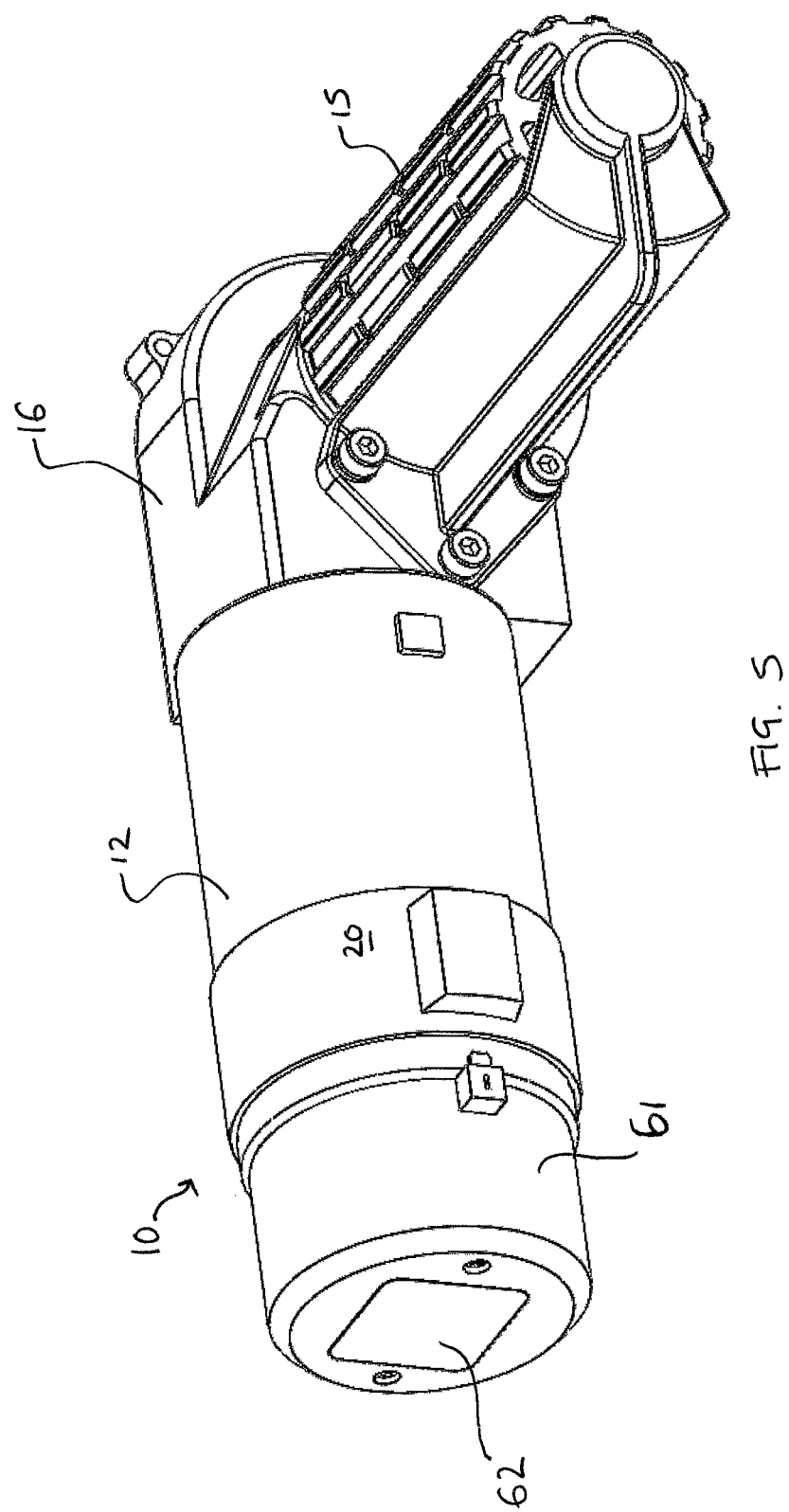
FIG. 5 is a perspective view of a further embodiment of a caravan mover with an attached battery.
Figure 6:
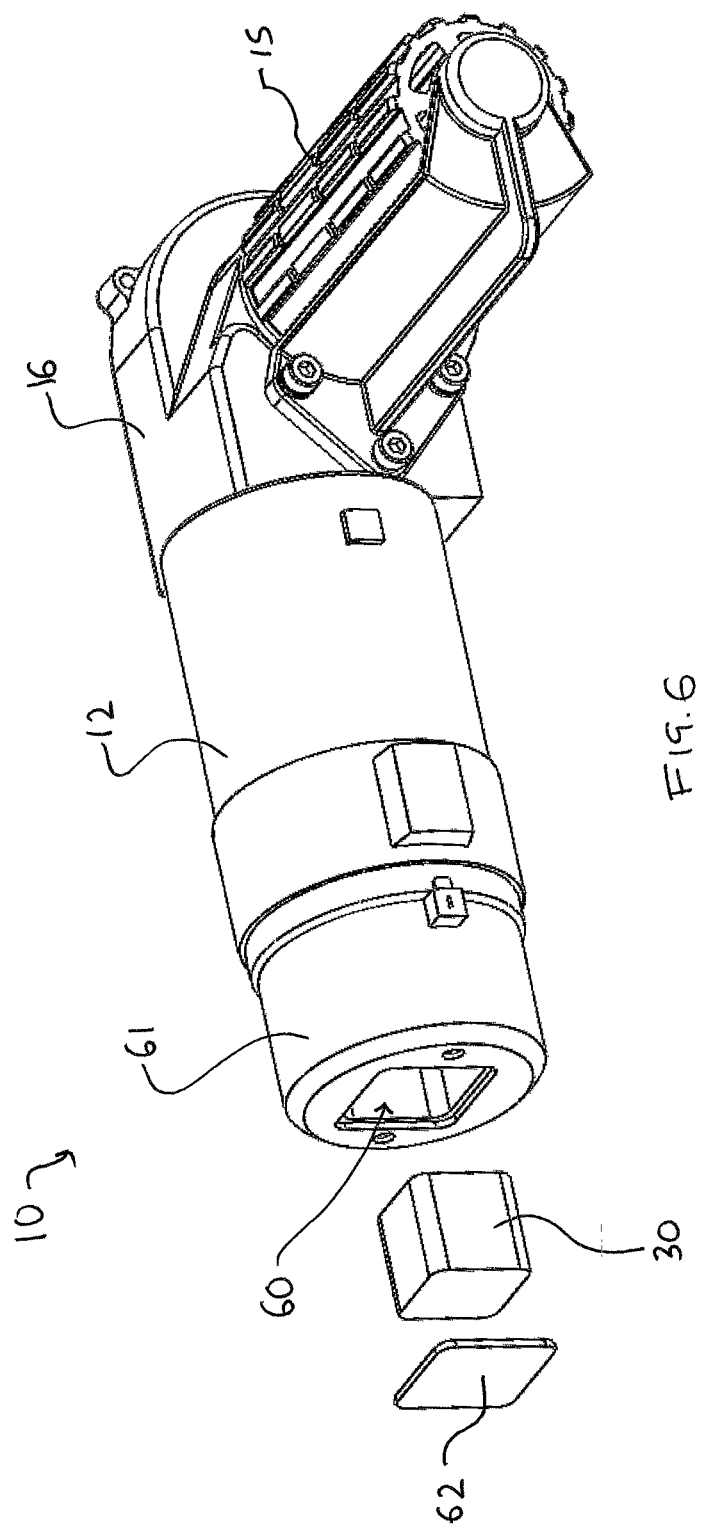
FIG. 6 is a perspective view of a further embodiment of a caravan mover with a detached battery.

In a further embodiment shown in FIG. 5 and FIG. 6, the battery 30 is arranged to be fully enclosed within a specific battery compartment 60. This battery compartment 60 is provided with a cover section 62 which completes the compartment 60 defined in a part (end face) of the housing 20. In this embodiment, the battery 30 is inserted into the compartment 60 in order for the respective battery terminals to be securely retained in contact with receiving terminal of the motor 12. The cover 62 is then secured over the compartment 60 by a securement element or a clip type system. The cover 62 may help to increase the protection for the battery 30 and prevent water damage to the terminals or contacts. The compartment 60 may also help to increase the security of the battery 30 during transit where the caravan mover is exposed to significant vibrations.

Since the battery 30 is directly engaged to the housing 20 of the drive unit and forms an integral caravan mover 10 then this makes the caravan mover 10 easy to install. The caravan over 10 is a self-supporting integrated component which just requires fixing to the chassis of the caravan. The complete/entire weight of the battery 30 is solely supported/suspended from the housing 20 and no externally exposed cables or wires are required. The caravan mover 10 does not use a remote battery requiring any cables and therefore maintains the integrity of the shell of the caravan since no penetration of this shell is required in order to route cables towards a power source.

Furthermore, since the battery 30 forms an integral part of the caravan mover 10, all of the elements of the caravan mover 10 are mounted using the same mounting system which makes the caravan mover 10 easier to be secured retrospectively. The size of the battery 30 for the present invention is significantly smaller and also lighter than a conventional heavy leisure battery. These leisure batteries are currently used to power caravan movers and the present invention therefore provides a significantly smaller and lighter system. The sole purpose of the battery 30 is to power the caravan mover 10 and, therefore, the voltage at which the battery 30 operates is not limited. Accordingly, the voltage can be increased from a conventional 12 volts for caravan movers and this may result in a reduced voltage drop compared to prior art systems. Any wiring required internally within the caravan mover 10 is also considerably smaller, lighter and cheaper.

As mentioned above, the ability to increase the voltage within the system can significantly increase the efficiency of the motor 12. This results in the caravan mover 10 of the present invention being smaller and lighter than a conventional 12 volt powered caravan mover. This helps to reduce any stress on the motor and thereby improves the lifespan of the system.

As described above, the batteries 30 are easily removable and have quick charging times due to the lower capacity requirements. Accordingly, even if a user had forgot to charge a battery 30 or was in a situation where the battery 30 was drained, it would be a relatively simple task of removing the batteries 30 and putting them in a charging unit. The user also has the option to buy and carry spare batteries 30 which reduces the risk of a situation where a user cannot use the caravan mover 10.

Since the present invention does not require the use of exposed cables/wires from the battery 30 to the mover/control unit, the installation process is significantly easier and quicker compared to prior art systems.

As described above, the battery 30 is rechargeable and the caravan mover 10 may be provided with a charging station. This enables a user to either charge batteries 30 within the caravan when it is hooked up at a caravan site and/or when the user is at home. The battery 30 may comprise a lithium battery. In preferred embodiments, the battery may comprise a 24V battery or a 48V battery.

The present invention also provides a battery powered mover using higher voltage batteries relative to know caravan movers.

Typically caravan movers run at 12 V. This is because the leisure battery that is used to power the mover is also used for all other electrical components within the caravan, such as lighting and electrical sockets. In the present invention, since the battery for the mover will be a standalone power supply, the detachable battery may have an increased voltage. In particular, the detachable battery may be 24 V, 48 V or greater than 48 V. The use of this higher voltage has a number of benefits and advantages.

In such higher voltage batteries, the current may be lower which means that the motor can run faster and be more efficient. This could mean that a smaller motor is used, or the same sized motor could operate more efficiently. The advantages to using a higher voltage battery include the use of a smaller battery to provide the same battery life as a 12V battery. Alternatively a battery of the same size would have a longer capacity. Since the currents are considerably lower as the voltage is increased, the wiring can be much smaller, reducing cost and weight. Again as currents are lower, the electrical components can be sized and rated accordingly further reducing weight and cost.

Figure 7:
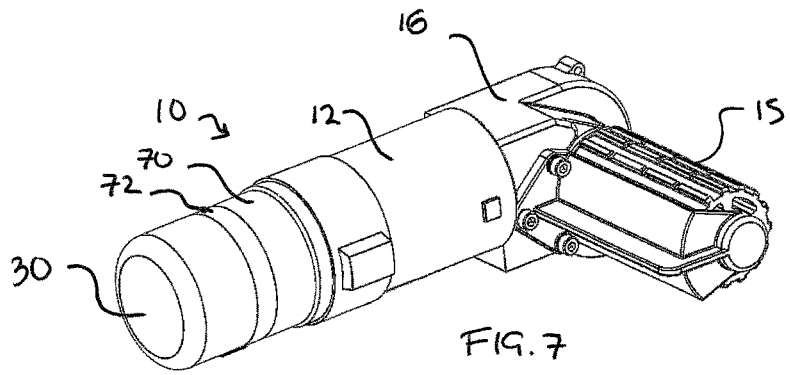
FIG. 7 is a perspective view of a first alternative embodiment of a caravan mover with an attached battery and an attached control unit.
Figure 8:
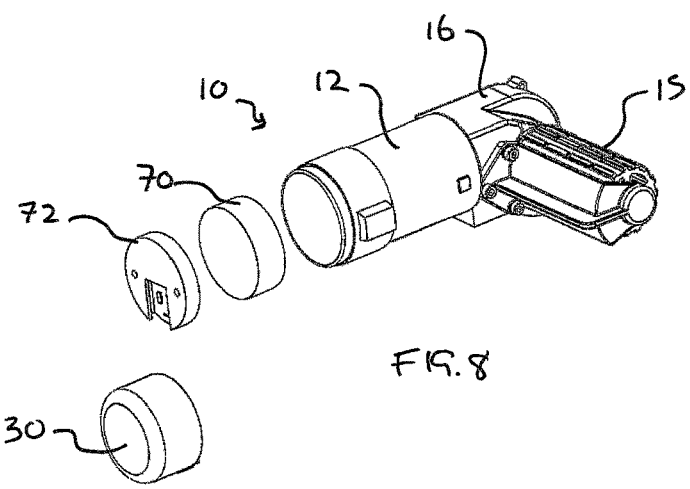
FIG. 8 is an exploded perspective view of a first alternative embodiment of a caravan mover with an attached battery and an attached control unit.

As shown in FIG. 7 and FIG. 8, a first alternative embodiment of a caravan mover 10 comprises a control unit 70 (electronic control unit (ECU)) which is arranged to locate between the motor 12 and the battery 30. In particular, a battery receiver 72 (battery holder) is secured to an outer end of the control unit 70 and this detachably receives the battery 30.

Figure 9:
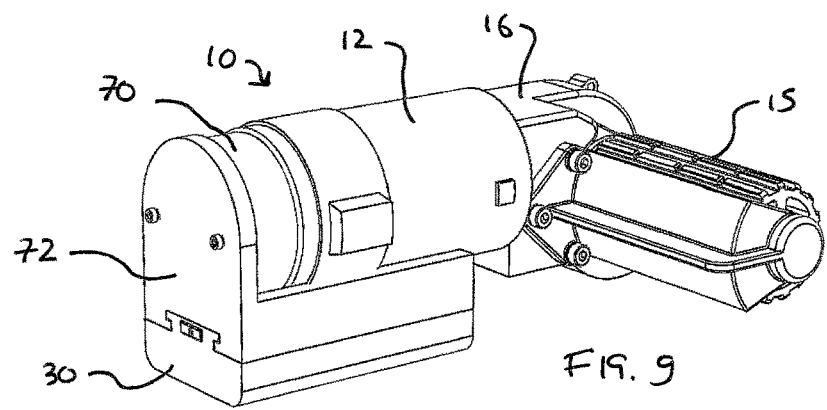
FIG. 9 is a perspective view of a second alternative embodiment of a caravan mover with an attached battery and an attached control unit.
Figure 10:
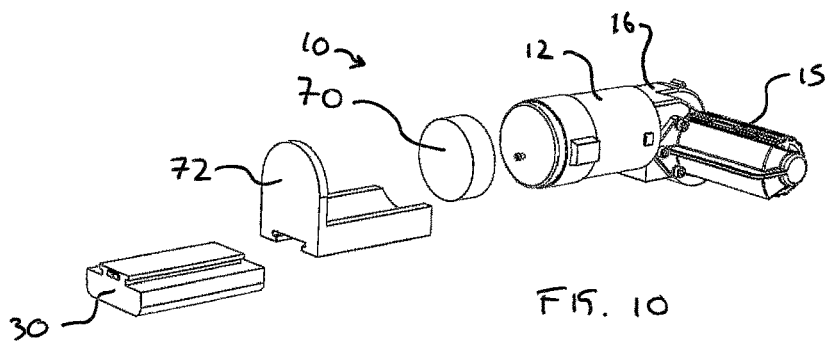
FIG. 10 is an exploded perspective view of a second alternative embodiment of a caravan mover with an attached battery and an attached control unit.

A second alternative embodiment of a caravan mover 10 is shown in FIG. 9 and FIG. 10, in which the control unit 70 locates between the battery 30 and the motor 12. Again, a battery receiver 72 is provided in order to mount the battery within the caravan mover 10.

Figure 11:
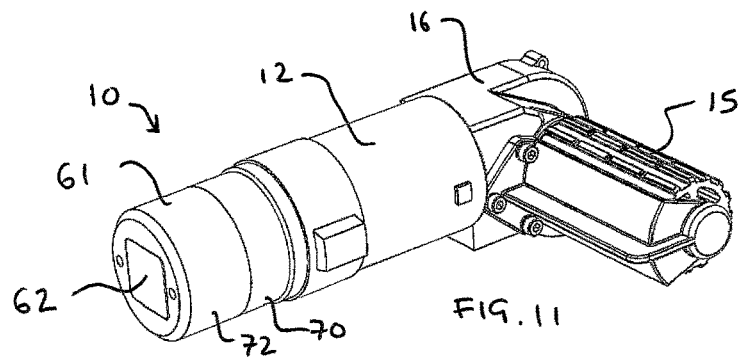
FIG. 11 is a perspective view of a third alternative embodiment of a caravan mover with an attached battery and an attached control unit.
Figure 12:
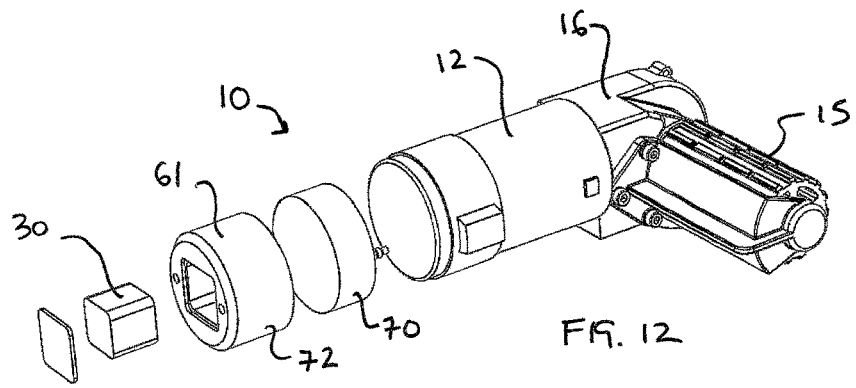
FIG. 12 is an exploded perspective view of a third alternative embodiment of a caravan mover with an attached battery and an attached control unit.
Figure 13:
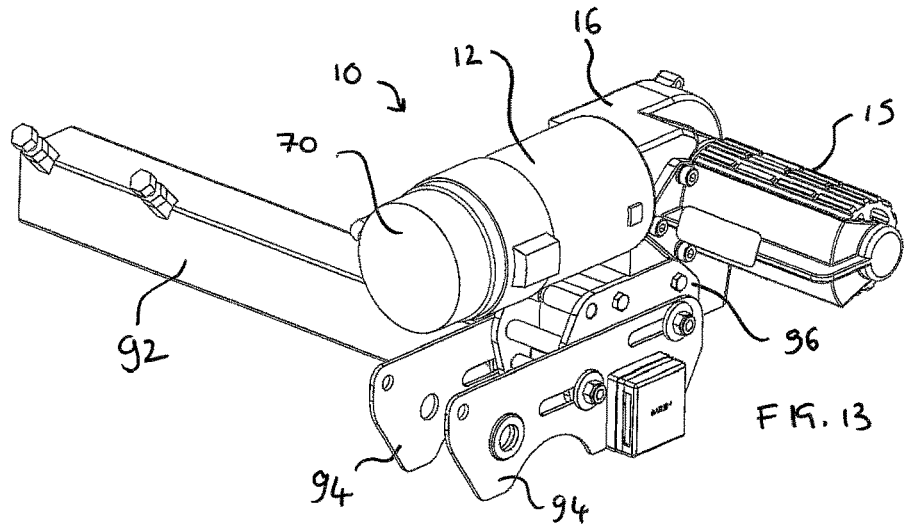
FIG. 13 a perspective view of a fourth alternative embodiment of a caravan mover with an attached control unit and an attached battery.
Figure 14:
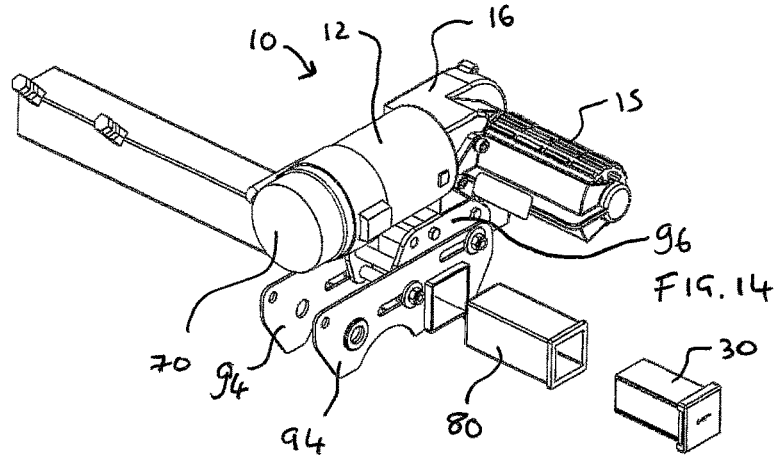
FIG. 14 is a partially exploded perspective view of a fourth alternative embodiment of a caravan mover with an attached control unit and an attached battery.
Figure 15:
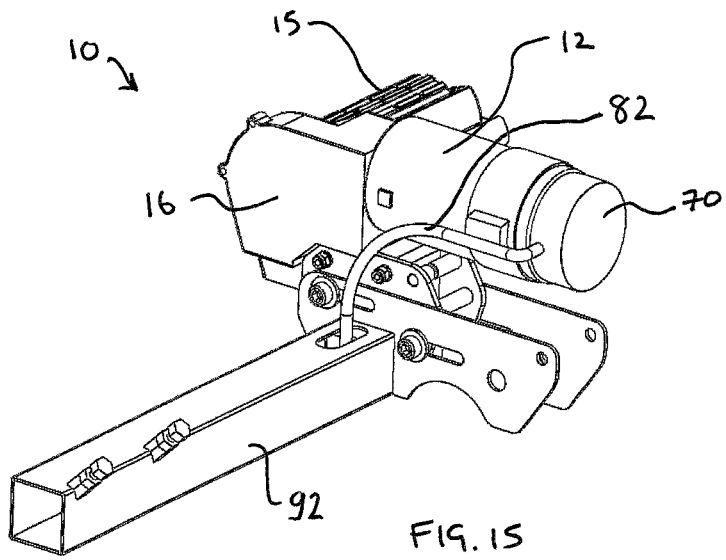
FIG. 15 a perspective view of a fourth alternative embodiment of a caravan mover with an attached control unit and an attached battery.
Figure 16:
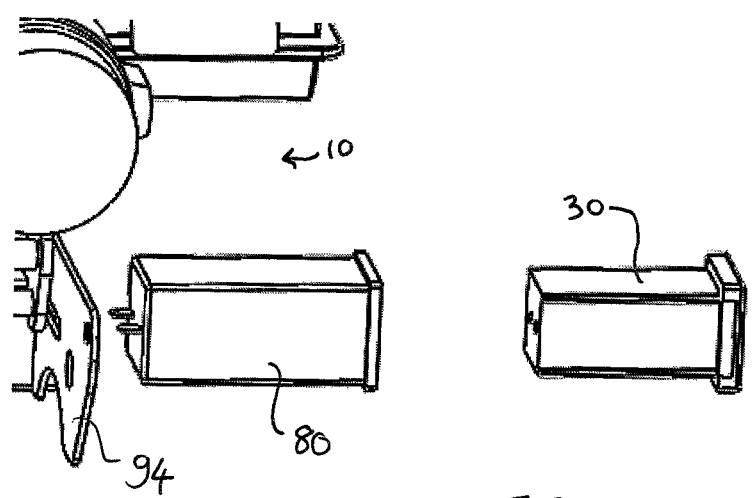
FIG. 16 is a side exploded view of a part of a fourth alternative embodiment of a caravan mover with an attached control unit and an attached battery.

Similarly, a third embodiment of a caravan mover 10 (shown in FIG. 11 and FIG. 12) includes a control unit 70 located between the battery 30 and the motor 12. The battery receiver 72 is in the form of a compartment housing 61 which provides a protective enclosure for the battery 12.

In a further embodiment, shown in FIG. 13, FIG. 14, FIG. 15 and FIG. 16, the battery is located within a battery receiver 80 which is secured within the mounting frame. In particular, the mounting frame includes an elongate mounting member 92 which has an open end (outer/exposed end) into which the battery receiver 80 is inserted and secured/retained. The mounting frame also provides mounting brackets 94 between which a mounting carriage 96 is movably supported, i.e. the driven roller 15 and other elements are slidably/translationally movable between the brackets between the disengaged position and the engaged position.

In this embodiment, a power cable(s) 82 is provide to deliver power from the battery 30 (battery receiver 80) to the control unit 70.

Figure 17:
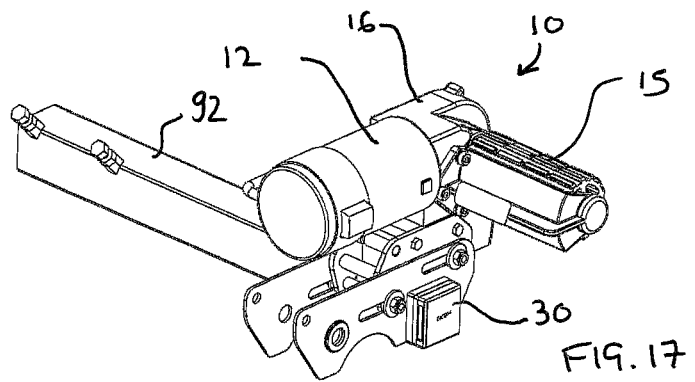
FIG. 17 a perspective view of a fifth alternative embodiment of a caravan mover with an attached control unit and battery.
Figure 18:
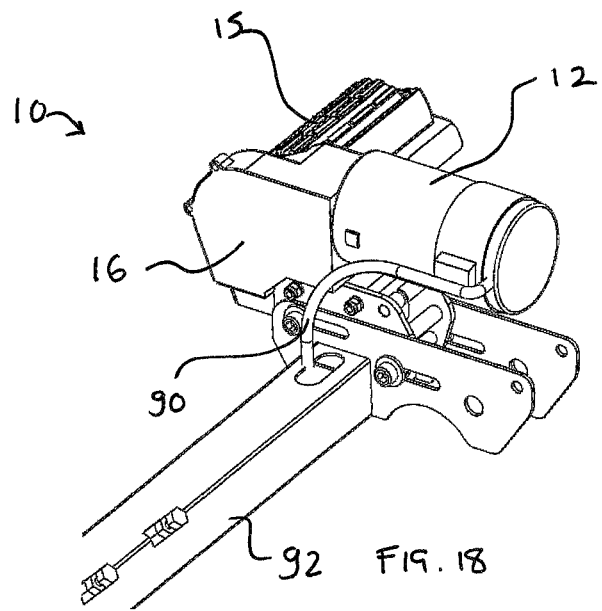
FIG. 18 is a perspective view of a fifth alternative embodiment of a caravan mover with an attached control unit and battery.
Figure 19:
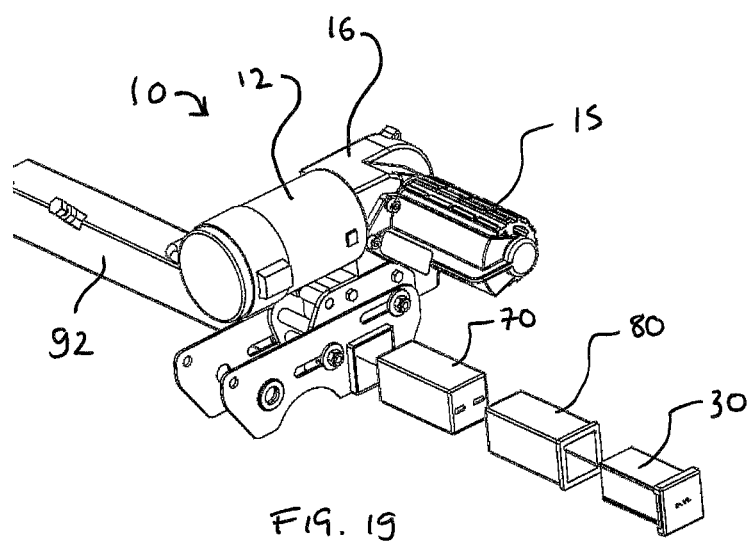
FIG. 19 is a partially exploded perspective view of a fifth alternative embodiment of a caravan mover with an attached control unit and battery.

In a yet further embodiment shown in FIG. 17, FIG. 18 and FIG. 19, the control unit 70 is mounted within the mounting member 92. The control unit 70 locates between the battery 30 and the motor 16. The control unit 70 is located within a conduit provided by the mounting member 92 and is positioned beyond the end of the battery receiver 80. Accordingly, in use, the battery 30 can be quickly and easily inserted and removed from this protective enclosure. A power cable(s) 90 is provided to connect the control unit to the motor 12.

Figure 20:
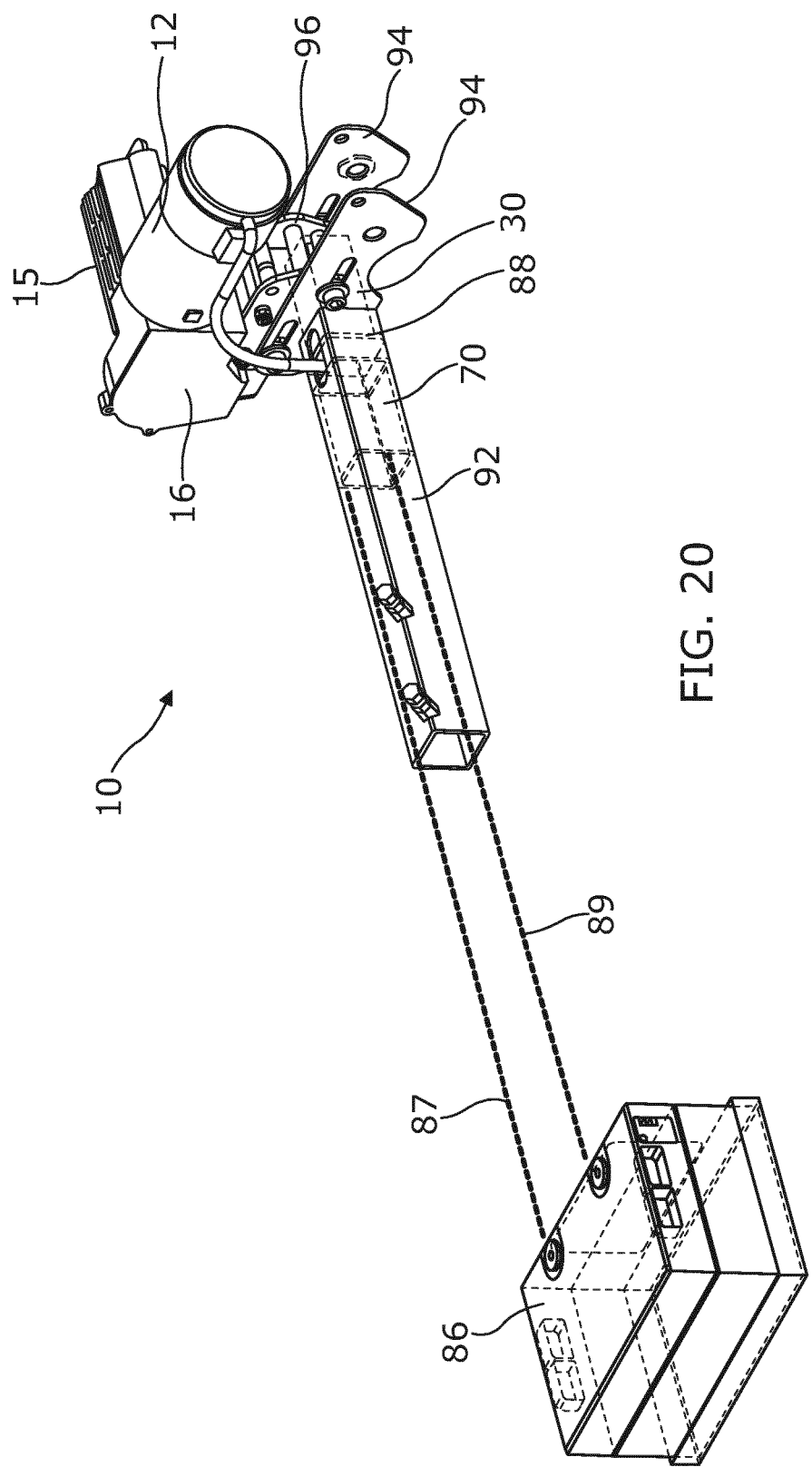
FIG. 20 is a perspective view of a sixth alternative embodiment of a caravan mover in communication with a remote recharging power supply.
Figure 21:
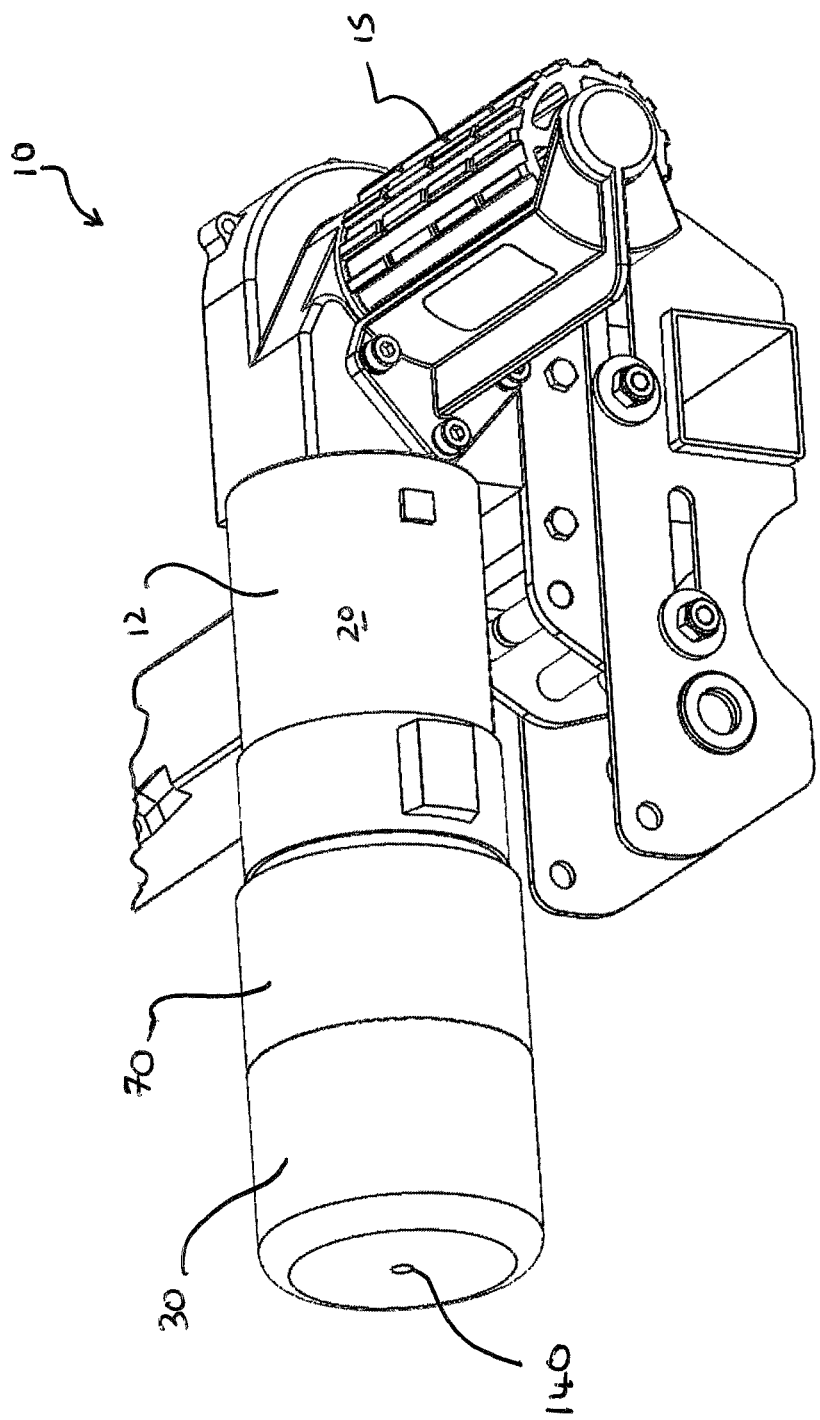
FIG. 21 is a perspective view of a preferred embodiment of a caravan mover with an attached control unit and battery.
Figure 22:
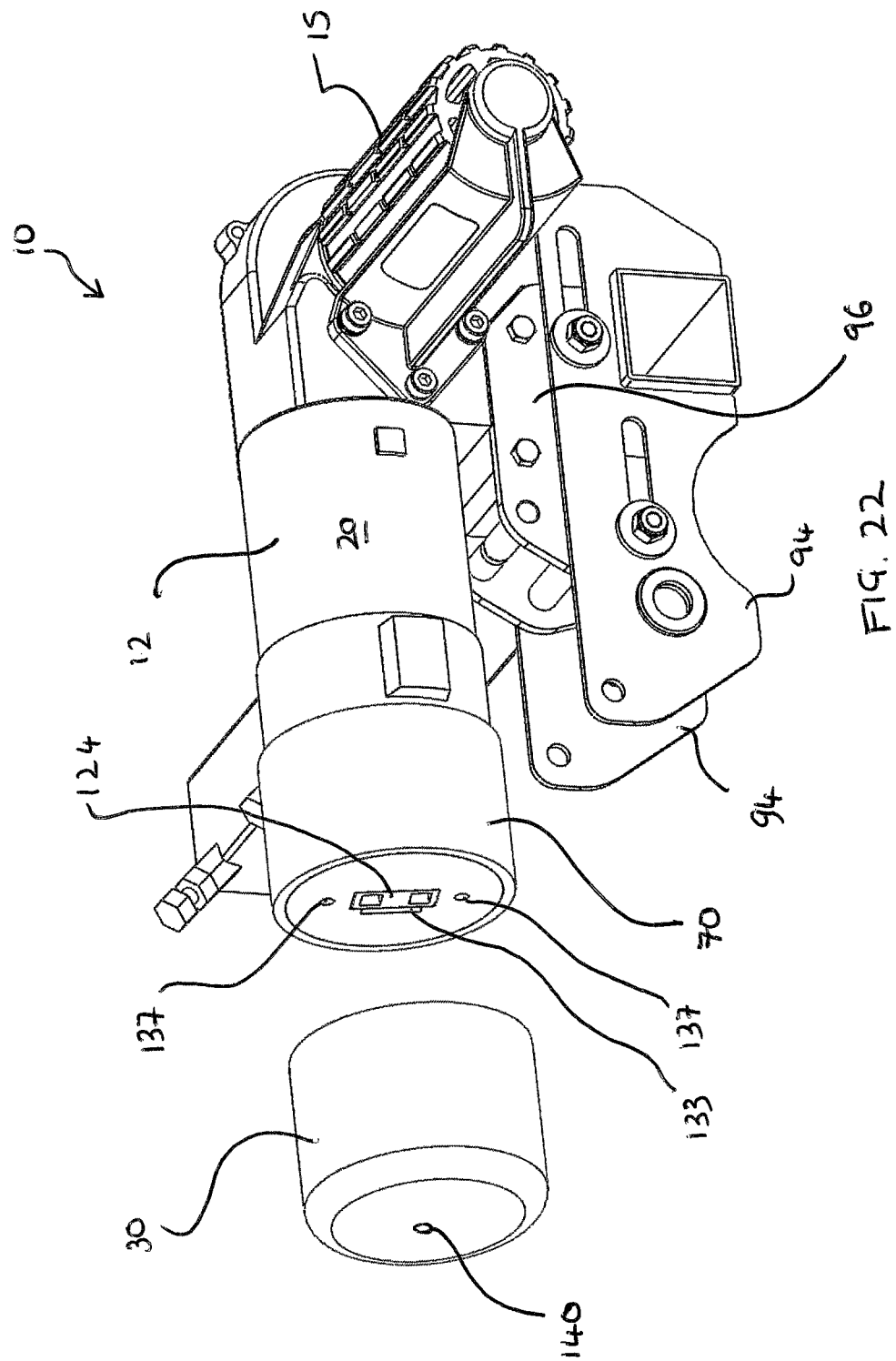
FIG. 22 is a perspective view of a preferred embodiment of a caravan mover with an attached control unit and a detached battery.
Figure 23:
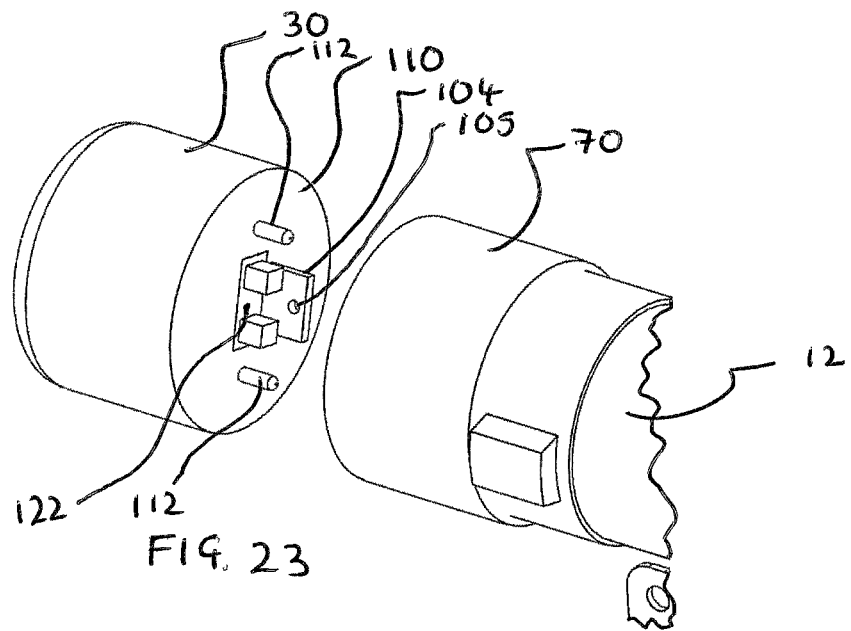
FIG. 23 is a perspective view of a part pf a preferred embodiment of a caravan mover with an attached control unit and a detached battery.

In a further alternative embodiment shown in FIG. 20, the or each (detachable) battery 30 is rechargeable from the 12 V leisure battery system within the caravan or the mains voltage system within the caravan. In this arrangement, charging cables 87, 89 are provide to extend between the 12 V leisure battery within the caravan and the battery 30 either directly or indirectly. This recharging arrangement may be particularly beneficial when the caravan is plugged in at home or at a campsite.

The battery 30 that powers the mover has the facility to be charged by either the 12 V caravan leisure battery 86 directly, or through the leisure battery 86 when the caravan is hooked up to 110 V at home or on a campsite. The mover mounted battery 30 and ECU 70 could be arranged in any of the ways previously stated above. The 12 V leisure battery may interface with the ECU 70, or it could interface with a separate secondary charging device 88 before interfacing with the mover battery 30. The secondary charging interface 88 could also be built into the ECU 70 or mover battery receiver, or a stand alone unit.

As shown in FIG. 21 to FIG. 26, the preferred embodiment of the drive unit 10 comprises a motor 12, an ECU 70 and a removable (detachable) battery 30. These three components are arranged and locate in-line to form a generally cylindrical unit extending perpendicularly relative to the roller 15. The drive unit 10 (comprising the motor 12, ECU 70 and removable battery 30) is solely supported on a carriage 96. As previously explained, the carriage 96 statically mounts the drive unit 10 to the caravan and, in particular, relative to the chassis of the caravan. This mounting carriage 96 is movably mounted within a mounting frame which may be provided by two spaced apart brackets 94. The brackets 94 provide mounting slots into which engage mounting elements (lugs) which project outwardly from the lateral sides of mounting carriage 96. These slots may enable the position of the drive unit 10 relative to the wheel to be adjusted and set.

In the preferred embodiments, locking means 100 is provided in order to lock the removable battery 30 within the drive unit 10. This locking means 100 secures the battery 30 and may prevent or at least inhibit the unauthorised removal/detachment of the battery 30. For example, a locked battery 30 may prevent theft and/or the battery 30 becoming otherwise detached when not specifically desired.

The locking means 100 (locking device or locking mechanism) comprises an electronic lock including a movable locking bolt 102 mounted on one component (ECU 70) and a corresponding receiver 104 mounted on the other component (battery 30). In particular, the locking means comprises a solenoid locking mechanism 101 including a lock bolt 102 and a keep 104 which functions as the receiver 104 for the lock bolt 102.

Figure 24:
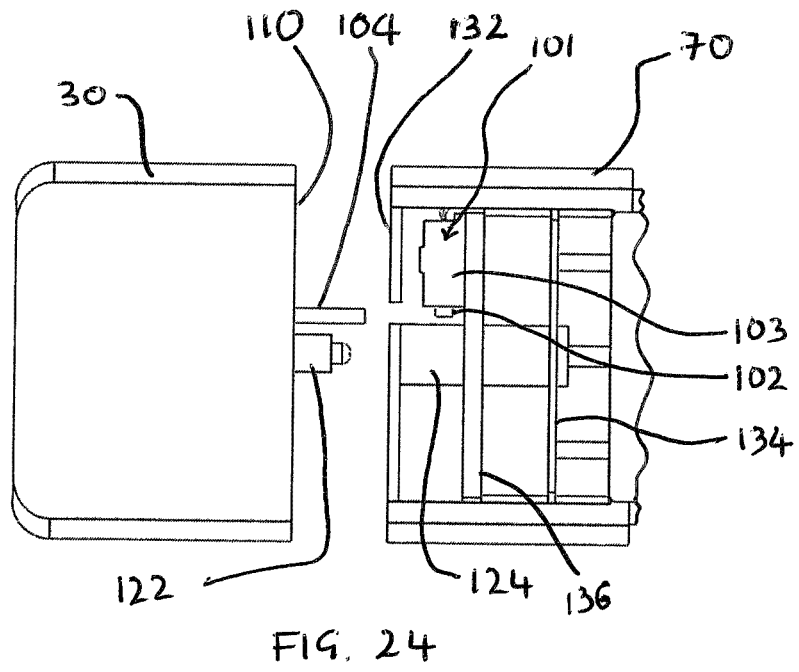
FIG. 24 is a schematic cross section of a part of a preferred embodiment of a caravan mover with an attached control unit and a detached battery.

The lock bolt 102 in mounted internally within the ECU 70, as shown in FIG. 24. The solenoid lock 101 includes the lock bolt 102 which moves translationally in to and out from a main body 103. The corresponding keep 104 is mounted on an end face 110 of the battery 30 which creates the interface with an end face 132 of the ECU 70.

The keep 104 comprises a plate which defines an aperture 105 of dimensions to readily accept the distal end of the lock bolt 102. The battery 30 may be attached within the drive unit 10 and then the solenoid lock 101 is able to be activated in order to lock the battery 30 within the drive unit 10.

The solenoid lock bolt 102 is activated to be withdrawn into the lock body 103 and hence moved to an unlocked (disengaged) position. This withdrawal/unlocking movement is achieved by supplying power to the solenoid lock 101. Conversely, the absence of a power supply to the solenoid lock 101 causes the lock bolt 102 to be in an extended (locked/engaged) position. Accordingly, the default position for the lock bolt 102 is the locked position. The solenoid 101 lock may comprise a spring or other urging/bias mechanism to provide the desired default (locked) position.

The drive unit 10 includes an electrical connector 120 in order for the battery 30 to be readily detachable and attachable with the attachment automatically establishing the electrical supply for the drive unit 10 from the battery 30. The battery 30 comprises a first connector member 122 whereas the ECU 70 comprises a complimentary second connector member 124. In particular, the connector members 122, 124 may comprises plug compatible connectors, for example Anderson Powerpole connectors.

The two compatible connector members 122, 124 are provided as a male connector 122 and a female connector 124. As shown in FIGS. 22 to FIG. 26, the male connector 122 is provided on the battery 30 and the female connector 124 is provided on the ECU 70. Each connector 122, 124 provides two terminal ends which will connect to enable the electrical supply to be established upon attachment of the battery 30 to the ECU 70.

As shown in FIG. 24, the female connector 124 provided on the ECU 70 is embedded and recessed such that the female connector does not project outwardly from the ECU 70. This aims to reduce the longitudinal length of the ECU 70 and hence the overall length/size of the drive unit 10. In particular, the PCB 134 provides an opening through which the female connector 124 locates to help provide a compact ECU 70. Similarly, the male connector 122 is embedded within the battery 30 with only the required projection of the male terminals to establish a full connection with the female connector 124.

The ECU 70 comprises an outer housing 130 (cylindrical shell) which is arranged to contain the main control system. The ECU 70 includes a cover face plate 132 providing access into the female connector 124. The ECU 70 also comprises a printed circuit board (PCB) 134. The solenoid lock body 103 may be mounted on a mounting plate 136 within the ECU 70 which is located between the PCB 134 and the cover face plate 132.

The solenoid lock body 103, may also be mounted directly on the underside of the faceplate 132, this would remove the need for mounting plate 136.

The face plate 132 includes an aperture 133 through which the keep 104 mounted on the battery 30 passes as the battery 30 is being attached to the ECU 70. In the attached position, the aperture 105 in the keep 104 is aligned with the distal end of the lock bolt 102 such that the removal of power from the solenoid lock 101 causes the lock bolt 102 to extend and pass through the aperture 105 in the keep 104. This thereby locks the battery 30 within the drive unit 10.

The end face 110 of the battery 30 may comprise guide members 112 to guide the orientation and facilitate the easy connection of the battery 30 relative to the ECU 70. Similarly, the face plate 132 of the ECU 70 includes corresponding guide apertures/passageways 137 (guide holes).

Figure 25:
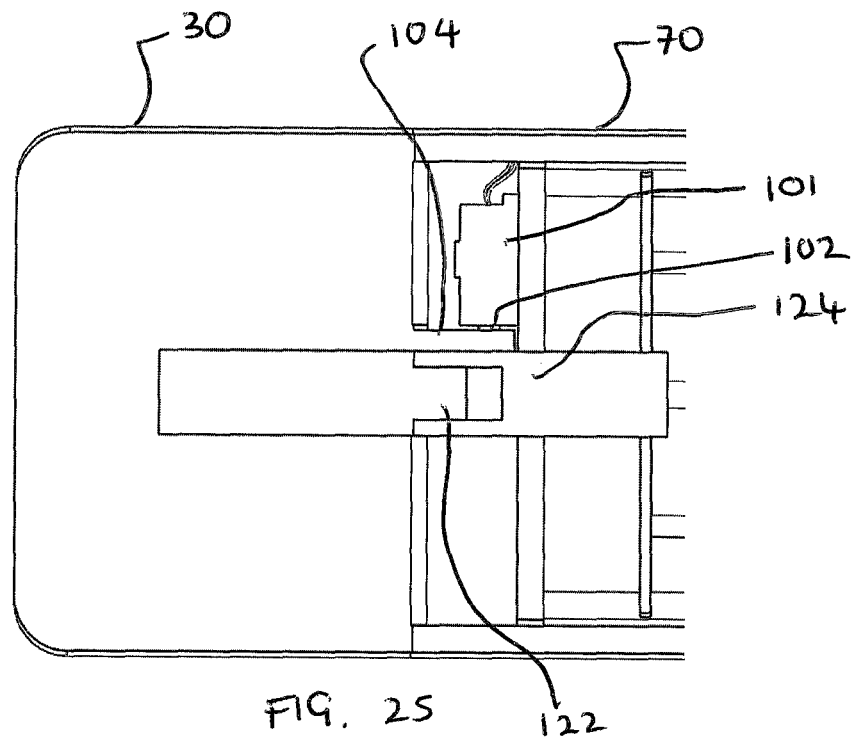
FIG. 25 is a schematic cross section of a part of a preferred embodiment of a caravan mover with an attached control unit and an attached battery in a locked configuration.

As shown in FIG. 25, in the locked position, no power is supplied to the solenoid lock 101 and hence the lock bolt 102 is in an extended position due to the action of a solenoid spring. A part of the lock bolt 102 engages in the receiver hole 105 in the keep 104 mounted on the battery 30 and this thereby locks the battery 30 to the ECU 70 and hence within the drive unit 10.

Figure 26:
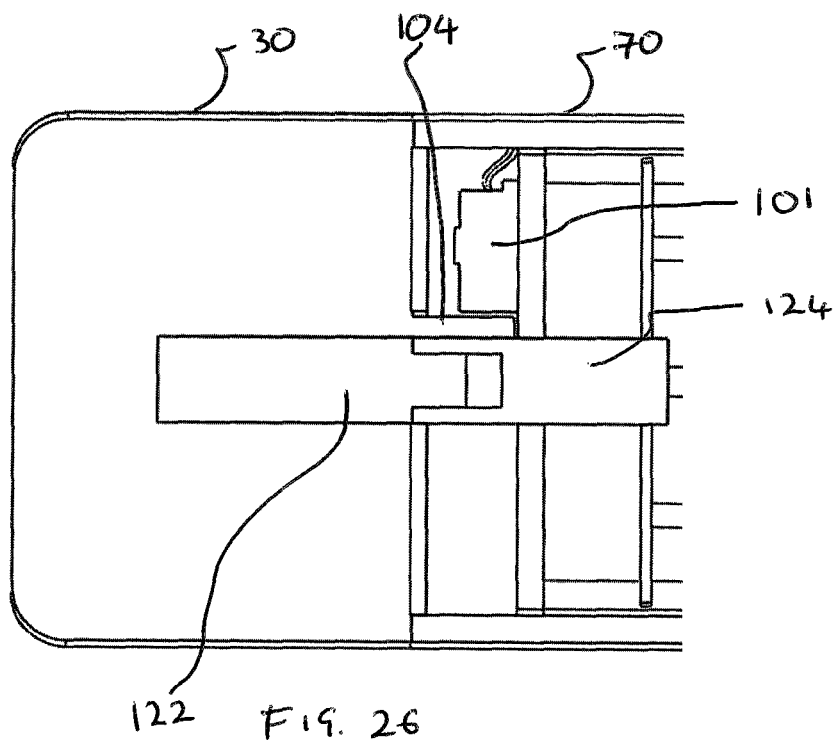
FIG. 26 is a schematic cross section of a part of a preferred embodiment of a caravan mover with an attached control unit and an attached battery in an unlocked configuration.

As shown in FIG. 26, in the unlocked position, power is supplied to the solenoid lock 101 and hence the lock bolt 102 is in a withdrawn position. The lock bolt 102 is not engaged with the receiver hole 105 in the keep 104 and this thereby does not prevent the removal/detachment of the battery from the ECU 70 and hence from the rest of the drive unit 10.

The ECU 70 is also removable from the drive unit 10. For example, a second solenoid lock may be arranged to lock the ECU 70 within the drive unit 10 and may lock the ECU 70 to the housing 20 of the motor 12. A second solenoid lock may be mounted on a base member secured to the outer face of the motor housing 20. The ECU housing 130 may provide a slot on an internal surface such that a distal end of the lock bolt of the second solenoid lock can be selectively engaged in order to lock and/or unlock the ECU 70 from the motor 12. The housing 130 of the ECU 70 may have an internal screw thread at the proximal end which engages with a corresponding screw thread provided on the base member. Alternatively, the ECU 70 may be secured to the housing 20 by other internal securement elements. This prevents the unauthorised removal of both (i.e. as a single integral component) the ECU 70 and the battery 30 even though the battery 30 is locked to the ECU 70. Such internal securement elements cannot be accessed whilst the battery 30 is secured to the ECU 70 and hence this prevents the ECU 70 from being removed from the drive unit 10 unless the battery 30 has been detached which requires the authorised removal due to the use of the solenoid lock/locking means 100.

The drive unit comprises an input 140 to enable an external power supply to be connected to the drive unit 10. The input 140 comprises a port on an external surface of the battery housing and enables an external power supply to be used to ensure that the solenoid lock 101 can be activated. For example, since the lock bolt 102 has a default position of the locked position, there is a potential for the lock bolt 102 to become inaccessible whilst in locked position if the power supply fails. Accordingly, if the power supply fails and/or the battery 30 becomes drained even whilst being attached within the drive unit 10, the port 140 can be used and the lock bolt 102 activated and moved to the unlocked position. This thereby enables the battery 30 to be detached and for the battery 30 to be placed in a recharging unit and for the lock bolt 102 to be inspected for problems. In addition, in some embodiments, this port 140 may be used to recharge the battery whilst the battery is attached within the drive unit 10.

Overall, in these embodiments, the ECU 70 (control box) is mounted to the motor mover. The removable battery 30 is mounted to the ECU 70 such that all three components are inline. The ECU 70 is mounted to the motor 12 using internal fixings, not accessible without removing the battery 30 and disassembling.

The locking means 100 and, specifically the solenoid lock 101 is controlled and activated by the use of a remote control unit which also operates and controls the drive unit/motor, i.e. the movement of the caravan. The remote control unit enables a user to move the trailer by wireless signals (e.g. infra-red). The device may include a handsets and/or control unit which use radio waves, but some embodiments may use Bluetooth.

The preferred embodiments of the present invention provide several variations and include one or more locks to secure the battery 30 to the ECU 70. This prevents the battery 30 from being removed or stolen, although if the battery 30 is removed the ECU 70 could be removed. In this variation the ECU 70 would be secured with internal fixings, but could be disassembled and removed if the battery 30 were not secured.

In other variations, one or more locks are provided to secure the ECU 70 to the motor 12. This prevents the ECU 70 from being removed or stolen when the battery 30 is not fastened (on charge for example), although this does not prevent the battery 30 from being removed. In this variation the ECU 70 would still be secured using internal fixings, but would have an additional lock(s) that would make them inaccessible.

In yet further variations, both of the above are utilised and one or more locks are provided between the battery 30 and the ECU 70 as well as one or more locks between the ECU 70 and motor body 20. This prevents the battery 30 from being removed or stolen, and prevents the ECU 70 from being removed if the battery 30 is not fastened (on charge for example). The ECU 70 would still have internal fixings to secure it to the motor 12, but would have a lock(s) that make them inaccessible.

The locks may be installed in all the versions/embodiments described above and shown in FIGS. 1 to 20. For example, if the battery locates 30 within a compartment (see FIG. 11 and FIG. 12) and/or the cover 62 locked or within a battery receiver 80 secured in an elongate mounting member 92 (see FIG. 13 to FIG. 20) the lock can be situated to lock the battery in position and for the ECU to be preferably locked in position.

The drive unit 10 is operated by a handset which has an LCD display with a thumbstick and multifunctional button. Accordingly, a dedicated button for operating the lock may not be provided on the motor mover/drive unit 10 itself or on a conventional handset. The software on the handset may provide a menu option that is navigated to and selected which will send the signal to the ECU to unlock the battery. It is possible in some embodiments that a physical button solely for unlocking the battery will be on the handset.

The locking functionality of the present invention prevents the ECU and/or battery from being stolen or removed. Internal fixings are used to fasten the ECU to the motor and these are only ever accessible when the battery is removed. By moving the lock to interface between the battery and the ECU, in its locked state all components are secure. Preferably a lock is located between both the battery and the ECU and the ECU and the motor.

Briefly, one or more solenoids or similar locking mechanisms (electro mechanical locking device) may be used. In some embodiments, a motorised device may be used rather than a solenoid device. In the preferred embodiments, a lithium battery is used although other suitable power means could be used. The motor is connected to the ECU either with small internal wires, similar quick connector, or even external wires/connections to suit different products. In some embodiments, the battery may clip, screw or slide into place. The preferred system is 24V, but other suitable voltages could be used and, in particular, higher voltage versions may be used. In the event of loss of power, the battery will remain locked, meaning it cannot be removed and put on charge. The user will be able to charge the battery in situ by connecting the charger up directly. Normally, the user will disconnect after every use and charge the battery in their caravan or at home on the supplied charging dock. The battery and ECU are water and impact resistant and therefore are suitable for use while towing.

The ECU preferably not only controls rotation of the roller which turns the caravan wheels, but it also controls the engagement and disengagement of the mover onto the tyre. There may be a manual override to back the mover off of (away from) the wheels when power is lost, but in alternative embodiments the removable battery concept could act as a security device. If the mover is left engaged on the tyre and the battery is removed, then the mover could no longer be disengaged preventing any rotation of the wheels. Accordingly, the present invention provides a security product to prevent unauthorised movement of the caravan.

In summary, as described above, typically the motor 12 is controlled by a separate control box (ECU) 70 which is then supplied power by the battery 30. In prior art devices, the control unit 70 is mounted within the caravan whereas, in the present invention, the drive unit 10 is provides a complete powered and controlled system.

The present invention comprises power means in the form of a detachable battery which is supported by the drive unit (caravan mover) to form a single integral self-supporting component. As described above, the ECU may be located on the drive unit but, in some embodiments, the ECU is located remotely in the caravan (or elsewhere).

The caravan mover 10 includes a metal carriage portion/mounting member 92 that could contain the battery 30 and/or the ECU 70 and this will double up as protection from impact damage whilst also being an effective heat sink for the electronic components. Naturally such an embodiment mitigates installation errors such as faulty connections and cross polarity, whilst reducing the set up time and weight of hard wiring as used in prior art devices.

The mounting means and framework will also help with the prevention of water ingression. Utilising the framework as a passive heatsink for the ECU and battery housing is effective and efficient. The device may include a handsets and/or control unit which use radio waves, but some embodiments may use Bluetooth.

In prior art devices, each control unit (ECU) can control a maximum two motors and if a user opts for a four motor system they would need two control boxes. Accordingly, a single handset must be paired to both boxes (ECUs) which then controls all motors simultaneously. The present invention aims to have one single control unit that can support four motors.

An ECU unit may has six inputs, positive and negative power (from the battery), positive and negative from a first motor, and positive and negative from a second motor. The present invention may utilise an ECU unit with ten inputs to allow four motors to be controlled for a single control unit.

The invention claimed is:

1. A drive unit for a trailer comprising a drive assembly, a power source and mounting elements, the mounting elements being arranged, in use, to be secured to a trailer, the drive assembly being arranged to rotate a wheel of a trailer around an axle of the trailer, the drive unit comprising an actuating mechanism to move the drive assembly between:
   a disengaged position, and
   an engaged position in which movement is transmitted from the drive assembly to a wheel of the trailer,
   wherein the power source comprises a detachable battery which is mounted directly within the drive unit and is supported therein and wherein the drive unit forms a single integral self-supporting component, and characterised in that:
   the drive unit comprises a locking mechanism and, in which, the locking mechanism is arranged to lock the detachable battery within the drive unit to prevent the unauthorised removal of the detachable battery wherein the locking mechanism comprises an electro-mechanical locking device.

2. A drive unit for a trailer according to claim 1 in which the locking mechanism comprises a remotely operated locking mechanism.

3. A drive unit according to claim 1 in which the locking mechanism comprises a solenoid locking mechanism.

4. A drive unit for a trailer according to claim 1 in which the drive unit comprises a first locking mechanism which is arranged to lock the battery within the drive unit and a second locking mechanism to lock a control unit, within the drive unit.

5. A drive unit for a trailer according to claim 4 in which the first locking mechanism is arranged to lock the battery to the control unit, and the second locking mechanism is arranged to lock the control unit to the drive assembly.

6. A drive unit for a trailer according to claim 4 in which the battery is locked to the control unit by a solenoid lock and the control unit is locked to the drive assembly by internal securement elements wherein the internal securement elements are not accessible whilst the battery is secured to the control unit.

7. A drive unit for a trailer according to claim 1 in which the drive unit comprises an auxiliary power supply input to supply auxiliary power to the drive unit and wherein the auxiliary power supply input enables auxiliary power to be supplied to the drive unit to supplement the power from the power source and/or to recharge the power source.

8. A drive unit for a trailer according to claim 1 in which the drive assembly comprises a motor, a drive transmission system and a roller and, in which, the motor drives the roller through drive transmitted through the drive transmission system and in which, in use, the weight of the detachable battery is solely supported from the drive unit.

9. A drive unit for a trailer according to claim 7 in which the detachable battery is arranged to be connected to the motor with internal connectors provided on an interface between the detachable battery and the motor and wherein the interface is concealed and shrouded when the battery is attached to the motor.

10. A drive unit according to claim 1 in which the detachable battery is arranged to be connected to a control unit with internal connectors provided on an interface between the detachable battery and the control unit and wherein the interface is concealed and shrouded when the battery is attached to the control unit.

11. A drive unit for a trailer according to claim 1 in which the mounting elements comprises a chassis mounting member which is arranged, in use, to be secured to a part of a chassis of the trailer, the mounting member providing an enclosure into which the detachable battery is supported.

12. A drive unit for a trailer according to claim 11 in which the enclosure has an opening located at one outer longitudinal end of the mounting member and a battery receiver is located within the enclosure which receives the detachable battery and engages with terminals of the battery.

13. A drive unit for a trailer according to claim 11 in which a control unit locates within the enclosure and a battery receiver also locates within the enclosure which receives the detachable battery and engage with terminals of the battery and wherein the drive unit comprises a power cable to connect the control unit with the drive assembly.

14. A drive unit for a trailer according to claim 1 in which the drive unit comprises a combined body and associated combined housing which comprises the drive assembly and control unit.

15. A drive unit for a trailer according to claim 1 in which the power source comprises a body which is arranged to be directly secured and engaged to a battery receiver which is provided by or secured to a body of the drive assembly and/or a body of the control unit.

16. A drive unit for a trailer according to claim 1 in which the drive unit comprises two receiving terminals which are arranged to receive power from two power terminals provided by the battery and wherein the terminals are all exposed when the battery is removed from the drive unit and, in which, the drive unit comprises a shroud portion which is arranged to protect the interface between the battery and the drive unit.

17. A drive unit for a trailer according to claim 1 in which the drive unit comprises a chamber into which the battery locates and is concealed therein and in which the chamber comprises a removable cover.

18. A drive unit for a trailer according to claim 1 in which the battery is contained in a battery enclosure and wherein the battery enclosure is water proof and shock proof.

19. A drive unit for a trailer according to claim 1 in which the drive unit comprises an actuating mechanism to move the drive assembly between:
  a disengaged position, and
  an engaged position in which movement is transmitted from the drive assembly to a wheel of the trailer,
  wherein the power source comprises a detachable battery which is mounted directly within the drive unit and is supported therein and wherein the drive unit forms a single integral self-supporting component, and characterised in that:
  the drive unit comprises a locking mechanism and, in which, the locking mechanism is arranged to lock the detachable battery within the drive unit to prevent the unauthorised removal of the detachable battery.

20. A method or providing drive to a wheel of a trailer, the method comprising mounting a drive unit to the trailer wherein the drive unit comprises a drive assembly and a power source, the drive assembly, being arranged to rotate a wheel of the trailer around an axle of the trailer, the power source comprising a detachable battery, the method comprising moving the drive assembly between:
  a disengaged position, and
  an engaged position in which movement is transmitted from the drive assembly to a wheel of the trailer,
  wherein the method further comprises mounting the detachable battery directly within the drive unit in order for the battery to be supported therein and wherein the drive unit forms a single integral self-supporting component, characterised by:
  locking the detachable battery within the drive unit with a locking mechanism to prevent the unauthorised removal of the detachable battery, wherein the locking mechanism comprises an electro-mechanical locking device.

21. A drive unit for a trailer comprising a drive assembly, a power source and mounting elements, the mounting elements being arranged, in use, to be secured to a trailer, the drive assembly being arranged to rotate a wheel of a trailer around an axle of the trailer, the drive unit comprising an actuating mechanism to move the drive assembly between:
  a disengaged position, and
  an engaged position in which movement is transmitted from the drive assembly to a wheel of the trailer,
  wherein the power source comprises a detachable battery which is mounted directly within the drive unit and is supported therein and wherein the drive unit forms a single integral self-supporting component, and characterised in that:
  the drive unit comprises a locking mechanism and, in which, the locking mechanism is arranged to lock the detachable battery within the drive unit to prevent the unauthorised removal of the detachable battery, wherein the locking mechanism comprises a remotely operated locking mechanism.

22. A drive unit for a trailer according to claim 21 in which the remotely operated locking mechanism comprises an electro-mechanical locking device.

23. A drive unit for a trailer according to claim 21 in which the drive unit comprises an actuating mechanism to move the drive assembly between:
  a disengaged position, and
  an engaged position in which movement is transmitted from the drive assembly to a wheel of the trailer,
  wherein the power source comprises a detachable battery which is mounted directly within the drive unit and is supported therein and wherein the drive unit forms a single integral self-supporting component, and characterised in that:
  the drive unit comprises a locking mechanism and, in which, the locking mechanism is arranged to lock the detachable battery within the drive unit to prevent the unauthorised removal of the detachable battery.

24. A method or providing drive to a wheel of a trailer, the method comprising mounting a drive unit to the trailer wherein the drive unit comprises a drive assembly and a power source, the drive assembly being arranged to rotate a wheel of the trailer around an axle of the trailer, the power source comprising a detachable battery, the method comprising moving the drive assembly between:
  a disengaged position, and
  an engaged position in which movement is transmitted from the drive assembly to a wheel of the trailer,
  wherein the method further comprises mounting the detachable battery directly within the drive unit in order for the battery to be supported therein and wherein the drive unit forms a single integral self-supporting component, characterised by:
  locking the detachable battery within the drive unit with a locking mechanism to prevent the unauthorised removal of the detachable battery, wherein the locking mechanism comprises a remotely operated locking mechanism.

\* \* \* \* \*